United States Patent [19]

Phillips

[11] Patent Number: 5,505,119

[45] Date of Patent: Apr. 9, 1996

[54] CONTROL VALVE HAVING PARASITIC LEAKAGE ORIFICES

[75] Inventor: Edward H. Phillips, Troy, Mich.

[73] Assignee: Techco Corporation, Southfield, Mich.

[21] Appl. No.: 339,506

[22] Filed: Nov. 14, 1994

Related U.S. Application Data

[63] Continuation of Ser. No. 183,579, Jan. 18, 1994, abandoned, which is a continuation of Ser. No. 885,533, May 19, 1992, abandoned, which is a continuation-in-part of Ser. No. 841,322, Dec. 25, 1992, Pat. No. 5,269,215.

[51] Int. Cl.$^6$ ..................................................... F15B 9/10
[52] U.S. Cl. ................................................ 91/375 R; 91/437
[58] Field of Search ............................ 60/392, 393, 468, 60/494; 91/375 R, 375 A, 437

[56] References Cited

U.S. PATENT DOCUMENTS

| | | |
|---|---|---|
| 3,730,207 | 5/1973 | Christensen ................. 91/437 |
| 4,425,759 | 1/1984 | Krusche . |
| 4,561,516 | 12/1985 | Bishop et al. ............... 91/375 R |
| 4,678,052 | 7/1987 | Suzuki et al. . |
| 4,768,604 | 9/1988 | Schipper ..................... 91/375 R |
| 4,848,402 | 7/1989 | Elser et al. . |
| 4,924,910 | 5/1990 | Tabata et al. . |
| 5,086,687 | 2/1992 | Elser et al. .................. 91/375 R |

FOREIGN PATENT DOCUMENTS

| | | | |
|---|---|---|---|
| 2259436 | 6/1973 | Germany | ............... 60/468 |

Primary Examiner—F. Daniel Lopez
Attorney, Agent, or Firm—Gifford, Krass, Groh, Sprinkle, Patmore, Anderson & Citkowski

[57] ABSTRACT

The present invention is directed to a vehicular power steering system having an "open-center" control valve that has substantially zero hydraulic flow gain at zero input deflection angle and yet has minimal control orifice area. An improved valving sub-assembly is used in the control valve with functions to rapidly restore hydraulic gain at relatively small input deflection angles. The improved valving arrangement includes small transverse leakage slots formed in a valve spool that are in fluid communication with either input or return flow distribution slots. The leakage slots are configured to form parasitic flow orifices which fluidically interconnect the output slots formed in the valve sleeve and which communicate with the fluid chambers formed on opposite sides of the piston in the power cylinder. Accordingly, a selectively variable leakage path is provided across the power cylinder. The parasitic flow orifices have uniform and/or non-uniform areas for permitting the performance characteristics of the valving sub-assembly to be readily customized.

10 Claims, 16 Drawing Sheets

CONTROL VALVE HAVING PARASITIC LEAKAGE ORIFICES

CROSS-REFERENCE TO RELATED APPLICATION

This is a continuation of application(s) Ser. No. 08/183,579 filed on Jan. 18, 1994, abandoned, which is a continuation of Ser. No. 885,533 filed May 19, 1992, abandoned, which is a continuation-in-part of Ser. No. 841,322, filed Feb. 25, 1992, now U.S. Pat. No. 5,269,215.

BACKGROUND AND SUMMARY OF THE INVENTION

The present invention relates generally to control valves of the type commonly utilized in vehicular power steering systems and, more particular, to such control valves having one or more parasitic leakage orifices provided for optimizing the performance characteristic of the power steering system.

It is known that power steering systems equipped with control valves having minimal control orifice area are capable of generating significant hydraulic gain at low, or even zero, input deflection angles. Such capability is demonstrated from the performance characteristics for the low speed section of the power steering valve described in SAE Paper 880707, and entitled 1988 LINCOLN CONTINENTAL VARIABLE-ASSIST POWER STEERING SYSTEM, which is incorporated by reference herein. However, the presence of significant hydraulic gain at zero input deflection angle typically results in unacceptably light "on-center" feel. As further described in the SAE paper, the steering system includes a parallel flow circuit having a conventionally sized orifice area which is progressively activated at higher speeds. Utilization of such a parallel flow circuit results in minimal hydraulic gain at low, or even moderate, input deflection angles. Unfortunately, a side effect of eliminating virtually all hydraulic gain at low input deflection angles is a significant reduction in steering precision. Under such conditions, the vehicle will tend to "wander" when subjected to transient conditions, such as those caused by wind loadings.

Modernly, the ability to provide variable hydraulic gain with respect to vehicular speed (i.e., commonly referred to as "speed sensitive" steering) is required in many power steering systems. A conventional method of providing speed sensitive steering is achieved by selectively varying the fluid supply flow rate to an otherwise standard control valve. This is usually accomplished via the incorporation of an EVO (electronically variable orifice) valve into the flow control circuit of the host system's fluid supply pump. As a result, a reduction in the fluid supply flow rate at higher vehicle speeds causes lowered hydraulic gain for the control valve. Thus, at very low vehicle speeds the amount of fluid flow through the control valve is maximized for reducing steering effort (i.e., for parking requirements). At higher vehicle speeds, as the rate of fluid flow through the control valve is reduced, any given amount of hydraulic steering assist requires a concomitantly greater input deflection angle. Since this requires rotational movement of the steering wheel against the restoring force of a spring member (i.e,. a torsion bar), more input torque is required such that steering forces are increased when the motor vehicle is being driven on the highway. Again however, the unwanted side effects of excessive valve deflection and a reduction in steering precision are present.

In the event that rapid steering wheel motion is required when the power steering system is subjected to the reduced flow rates (i.e., an "accident avoidance maneuver"), there may be insufficient fluid flow to adequately provide for the concomitant displacement of the system's utilization device, such as a power cylinder. This undesirable condition is commonly referred to as "pump catch" whereby the vehicle operator momentarily encounters a sharp increase in resistance to steering motion. Accordingly, means must also be provided for sensing rapid motions of the steering wheel and instantaneously modifying the EVO valve setting in order to increase flow to avoid the occurrence of "pump catch". Unfortunately, this leads to another unwanted side effect wherein steering effort is suddenly diminished during the "accident avoidance maneuver", which may potentially exacerbate the steering control difficulties already being encountered during the "accident avoidance maneuver".

Accordingly, the present invention is directed to providing a vehicular power steering system having an "open-center" control valve that has substantially zero hydraulic gain at zero input deflection angle, and yet has minimal control orifice area. Such a valving arrangement is desirable in that it leads to a rapid restoration of hydraulic gain at relatively small input deflection angles.

In a first preferred embodiment, an improved valving sub-assembly is provided having small transverse leakage slots formed in a valve spool that are positioned in fluid communication with either input or return flow distribution slots also formed in the valve spool. The leakage slots are configured to form parasitic flow orifices which fluidically interconnect output slots formed in a valve sleeve. In this manner, a selectively variable "leak" is provided across the power cylinder. As a result, the relationship between output pressure and valve deflection at, or near, zero valve deflection values is of a second order such that an output pressure slope having a substantially zero value at zero valve deflection is generated. Moreover, even though hydraulic gain is substantially zero at zero valve deflection, a smooth recovery to normal hydraulic gain values at modest values of valve deflection is generated for providing optimal static control characteristics for the power steering control valve.

As a related feature, since the parasitic flow orifices allow utilization of minimally sized main flow control orifices, the characteristic "output pressure vs. input deflection angle" curves are relatively widely separated as a function of load flow rates. This relationship is indicative of the presence of relatively large amounts of input torque modulation as rotational velocity inputs are made to the steering wheel. Therefore, the host power steering system "feels" highly damped and is very smooth in operation. In addition, a relatively stiff torsion bar can be utilized within the control valve, thus yielding increased steering precision steering wherein extremely small values of positional error (i.e., due to valve deflection) are present.

An alternate design philosophy is incorporated into another preferred embodiment of the present invention wherein first and second sets of parasitic slots are arranged such that their corresponding parasitic flow orifices close sequentially with respect to the input and return flow control orifices. More particularly, both sets of parasitic orifices are open at zero valve deflection. However, the first set of parasitic orifices closes at a smaller valve deflection than the input and return flow control orifices and the second set of parasitic orifices closes at a larger valve deflection than the input and return flow control orifices. This results in a greater range of design freedom for the valve designer in shaping the various output pressure vs. valve deflection characteristic curves as a function of load flow.

According to yet another feature of the present invention, the size and specific contour of the flow control orifices associated with the input slots, return slots and leakage slots can be varied to selectively customize the performance characteristics of the improved valving sub-assembly. Preferably, the slots are formed having edge profiles that define specific geometric shapes such as parallelograms, trapezoids, triangles, circles and the like.

Another feature of the present invention is to provide a unique valving arrangement for use in an improved "speed-sensitive" variable-assist power steering system. The valving arrangement may be utilized with either an otherwise standard open-center control valve or the open-center control valve having substantially zero hydraulic gain at zero deflection angle described above. In either case, the valving arrangement utilizes a valving sub-assembly that has been modified to include a secondary flow path for fluidically interconnecting the output slots formed in the valve sleeve in parallel with the power cylinder. A speed responsive valve mechanism is used for selectively controlling fluid flow through the secondary flow path. At low vehicular speeds, the speed responsive valve mechanism restricts flow through the secondary flow path such that primary flow paths through the valving sub-assembly generate the desired low speed values of hydraulic gain. Once the vehicle's speed exceeds a predetermined maximum value, the speed responsive valve mechanism is actuated to allow fluid to also flow through the secondary flow path such that for any given amount of hydraulic assist a concomitantly greater input torque is required.

Other features, objects and advantages of the present invention will become readily apparent to one skilled in the art upon analysis of the following written description taken in conjunction with the accompanying drawings and the appended claims.

DETAILED DESCRIPTION OF THE PREFERRED EMBODIMENTS

With particular reference to the drawings, an improved valving sub-assembly 10 is shown to include a valve spool 12 and a valve sleeve 14 (shown in phantom in its normally "centered" position surrounding valve spool 12). As will be appreciated, the specific physical construction of valving sub-assembly 10 is merely exemplary in nature such that valving sub-assembly 10 can be readily adapted for use in virtually any conventional vehicular power steering system having an open-center control valve. Thus, a control valve formed with an axial configuration (as opposed to the rotary type depicted in FIG. 1) could likewise be simply modified according to the teachings of the present invention. An example of a control valve suitable for incorporation of valving sub-assembly 10 therein is shown and described in U.S. Pat. No. 4,460,016 entitled ROTARY SERVOVALVE by Haga et al. which issued on Jul. 17, 1984, the disclosure of which is expressly incorporated by reference herein.

Figure 1:
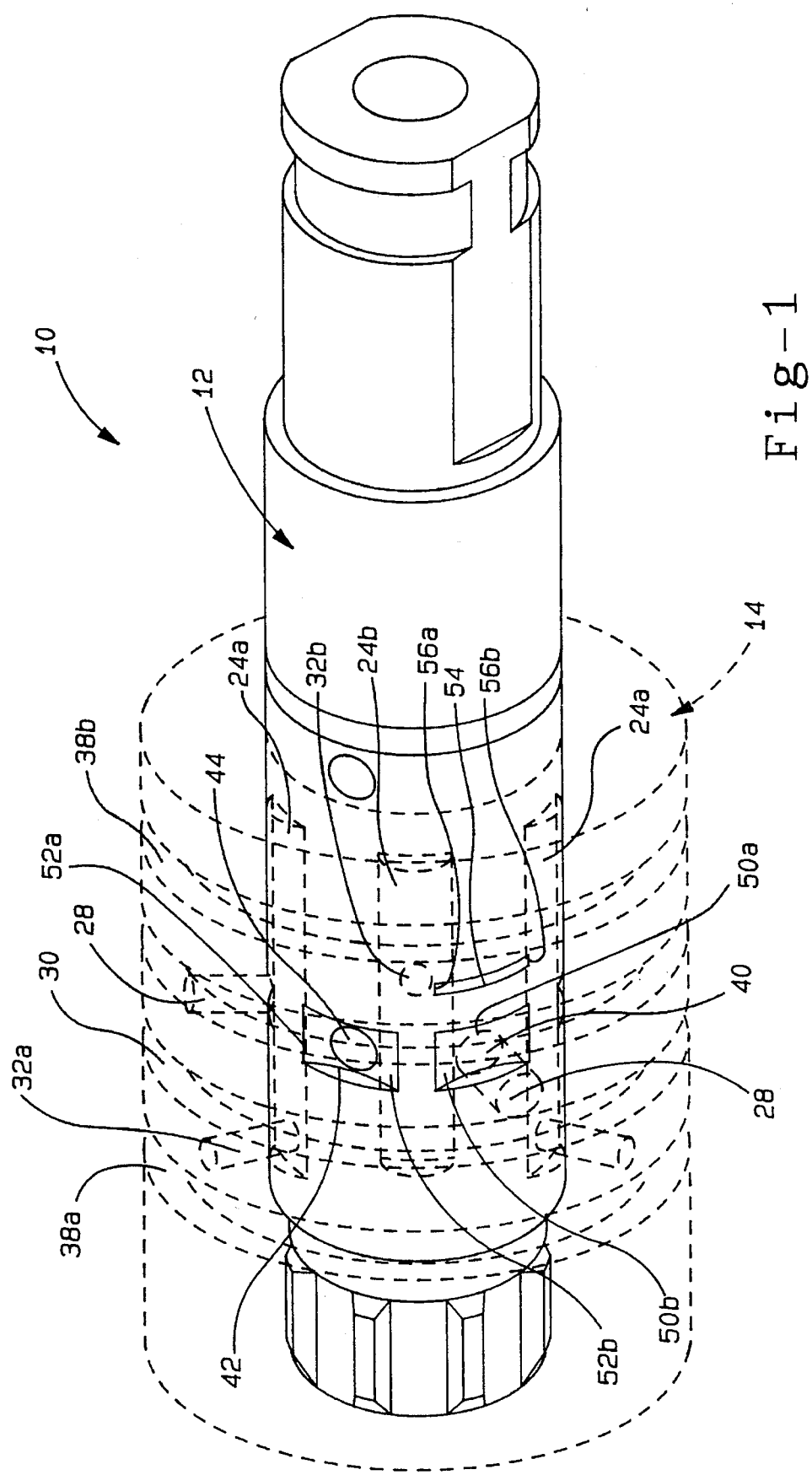
FIG. 1 is a perspective view of an improved valving sub-assembly for an open-center control valve showing the relative positioning of the inlet, return, parasitic and output slots associated therewith according to a first embodiment of the present invention.
Figure 2A:
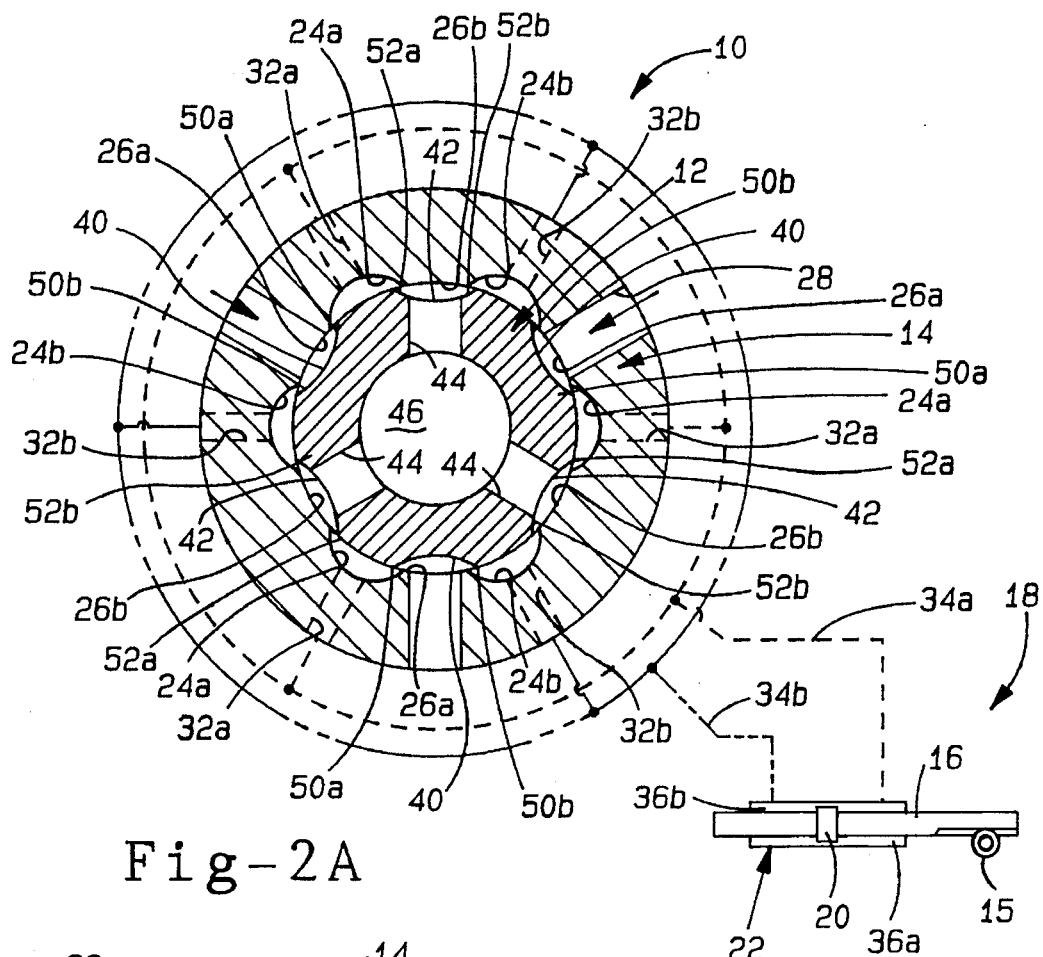
FIG. 2A is a sectional view illustrating the inlet and return flow control orifice configuration associated with the improved valving sub-assembly shown in FIG. 1.

With particular reference now to FIGS. 1 and 2A, improved valving sub-assembly 10 of the type adapted for use in a four-way "open-center" control valve of a vehicular power steering control apparatus is disclosed. As noted, valving sub-assembly 10 includes valve sleeve 14 and a valve spool 12 received therein, and which are rotatable with respect to each other within the control valve. As is known, the rotational position of valve sleeve 14 is substantially coupled to a pinion shaft 15 which is supported within the host vehicle's power steering control apparatus and which is meshingly coupled with a rack member 16 of a power steering piston/rack assembly 18. As is known, the opposite ends of rack member 16 are operably connected to the host vehicle's dirigible wheel assemblies via suitable steering linkage mechanisms in a conventional manner. As is schematically shown in FIG. 2A, rack member 16 is operably connected to a piston 20 that is movable within a power cylinder 22 of piston/rack assembly 18.

Valve sleeve 14 includes a plurality of axially extending valve slots 24 formed circumferentially about its inner surface thus defining lands 26 between adjacent valve slots 24. For clarity purposes, the alternating slots 24 are hereinafter referred to as first and second valve output slots 24a and 24b, respectively, while the alternating lands are hereinafter referred to as first and second lands 26a and 26b, respectively. Supply or input ports 28 are formed through first lands 26a which fluidly communicate with a housing pump port (not shown) formed in the control valve housing via an annular groove 30 formed in the exterior surface of valve sleeve 14. In addition, first and second output ports 32a and 32b, respectively, are formed in valve sleeve 14 and open at the bottom of first and second valve output slots 24a and 24b, respectively, and communicate with load lines 34a and 34b, respectively. Output pods 32a and 32b are in fluid communication with first and second chambers 36a and 36b, respectively, of power cylinder 22 via load lines 34a and 34b, respectively. More specifically, radial output pods 32a and 32b are fluidically coupled to their respective load lines 34a and 34b via annular output grooves 38a and 38b, respectively, formed in valve sleeve 14 and their respective distribution pods (not shown) formed in the control valve housing.

The circumferential exterior surface of valve spool 12 is formed with a plurality of inlet slots 40 which angularly correspond to input pods 28 formed through first lands 26a of valve sleeve 14. In addition, valve spool 12 is also formed to include an identical plurality of return slots 42 which are aligned in an alternating relationship relative to inlet slot 40 and are angularly aligned with second lands 26b. Exhaust pods 44 provide fluid communication between return slots 42 and internal chamber 46 for permitting the returning load flow to be delivered to a reservoir (not shown) in a conventional manner.

In operation, hydraulic fluid enters valving sub-assembly 10 from the housing input pod (not shown) via circumferential groove 30 and the plurality of radial input pods 28 formed in valve spool 12. Fluid then flows through the identically numbered plurality of inlet slots 40 formed in valve spool 12 to the identically numbered pluralities of first and second output slots 24a and 24b, respectively, formed in valve sleeve 14 via first and second input flow control orifices 50a and 50b, respectively. Therefore, any load flow demanded by the power steering system is delivered through one set of first and second output pods 32a and 32b, respectively, and its corresponding one of first and second circumferential grooves 38a and 38b, respectively, and its respective housing output pod (not shown) to its respective one of load lines 34a and 34b. Concurrently, the flow returning from the other of load lines 34a and 34b enters the control valve through the other of the housing output pods, the other of first and second circumferential grooves 38a and 38b, respectively, and the other of first and second output ports 32a and 32b, respectively. Thereafter, the returning flow passes through first and second return flow control orifices 52a and 52b, respectively, to the identically numbered plurality of return slots 42. Finally, the returning fluid flows through exhaust ports 44 and internal chamber 46 wherefrom it flows through a housing return port (not shown) to the reservoir.

In addition to the above, parasitic fluid flow is allowed to flow between first and second valve output slots 24a and 24b, respectively, via parasitic leakage slots 54 and one or more sets of first and second parasitic orifices 56a and 56b, respectively. In accordance with a preferred construction, inlet slots 40, return slots 42 and parasitic slots 54 are formed in the manner of transverse "woodruff key" slots. This can be seen most clearly in FIGS. 2A, 2B, 2C and 3 which are sectional views of transverse planes respectively taken through inlet and return slots 40 and 42, respectively, first and second output ports 32a and 32b, and parasitic slots 54. Generally, input and return slots 40 and 42, respectively, are formed in a relatively narrow manner such that input flow control orifices 50a, 50b and return flow control orifices 52a and 52b, which are formed by overlapping portions of inlet and return slots 40 and 42, respectively, and first and second valve output slots 24a and 24b, respectively, have a pre-selected minimum area. Moreover, the size and configuration of input flow control orifices 50a and 50b and return flow control orifices 52a and 52b are chosen such that a selected value of pressure drop (i.e., 25 [lb/in$^2$]) occurs at each flow control orifice when valving sub-assembly 10 is in its "centered" position.

The sets of first and second parasitic orifices 56a and 56b, respectively, are formed by overlapping portions of parasitic slots 54 and first and second output slots 24a and 24b, respectively. The length of parasitic slots 54 is selected such that respective ones of first or second parasitic orifices 56a or 56b, effectively limit parasitic flow upon closing of the controlling ones of first or second input flow control orifices 50a or 50b and/or return flow control orifices 52a or 52b in response to deflection of valve spool 12 relative to valve sleeve 14. Inlet slots 40, return slots 42 and parasitic slots 54 may, for instance, all be formed to be substantially equal in length as is generally shown in FIG. 1. However, other selected length relationships between inlet slots 40, return slots 42 and parasitic slots 54 may be chosen without departing from the spirit of the novel principles embodied in the present invention. Likewise, while FIG. 1 illustrates leakage slots 54 circumferentially aligned with inlet slots 40, it will be appreciated that such leakage slots could also be formed in alignment with return slots 42 or with both inlet slots 40 and return slots 42. By way of example, an alternate embodiment comprising two sets of symmetrically offset parasitic slots will be described hereinbelow in greater detail.

Figure 4A:
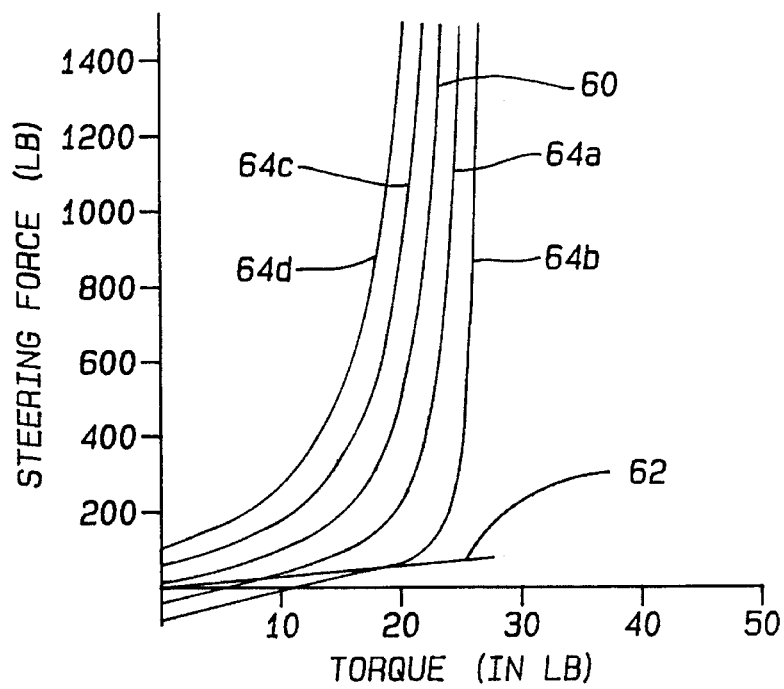
FIGS. 4A, 4B, 4C and 4D are exemplary graphs depicting the performance characteristic of a conventional speed controlled power steering system having parallel sets of low and high speed flow circuits.

The advantages associated with utilization of flow control valving having parasitic slots 54 in power steering system performance can best be judged by comparison with conventional "speed sensitive" control systems. As previously mentioned, it is known that a control valve with minimal control orifice area is capable of generating significant hydraulic "assist" at low, or even zero, input deflection angles. For instance, steering force as a function of applied torque (i.e, the torque applied to the steering wheel) for the low speed section of the steering valve noted in the above-identified SAE Paper would be substantially similar to that shown in FIGS. 4A and 4B. In FIG. 4A curve 60 depicts the total steering force derived as a function of applied torque under static conditions (i.e., when rotational velocities of the steering wheel are very slow) while line 62 depicts the "manual" (i.e., mechanical) steering force portion directly derived from applied torque via a mechanical path such as the pinion-rack interface of a rack-and-pinion steering gear.

Figure 4B:
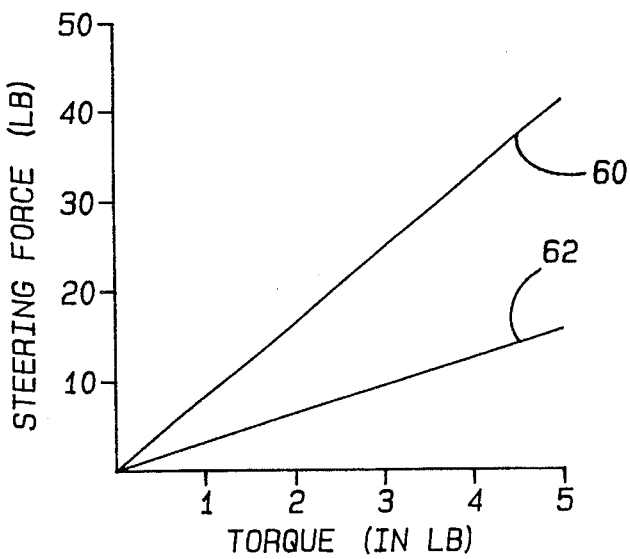

Exemplary curves 64a, 64b, 64c and 64d are presented to depict the total steering force derived as a function of applied torque for values equal to +1 [rev/sec], +2 [rev/sec], −1 [rev/sec] and −2 [rev/sec], respectively. This family of curves reflects relatively smooth and stable steering response for large steering motions which are commensurate with "parking" maneuvers. However, as shown in FIG. 4B by the significantly magnified portion of curve 60, total steering force has a significantly greater value than the corresponding manual steering force portion shown by line 62 at low values of applied torque. In fact, the difference between curve 60 and line 62 equals the hydraulically-derived steering "assist" generated. Of particular interest is a comparison of the slopes of curve 60 and line 62 at a zero value of applied torque. The ratio of the slope of curve 60 to line 62 is the hydraulic gain of the control valve. The significant value of hydraulic gain indicated in FIG. 4B denotes an excessively light steering "on-center" feel should the motor vehicle be driven on a highway with only minimal control orifice area.

Figure 4C:
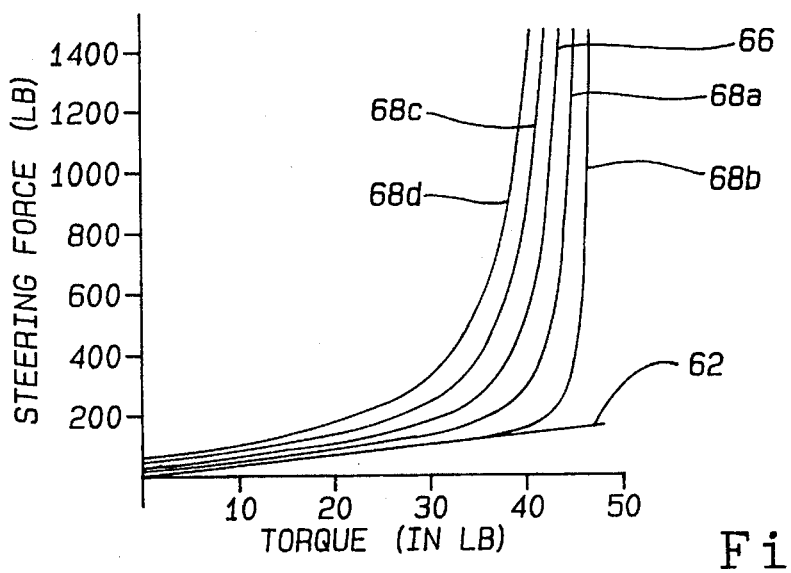
Figure 4D:
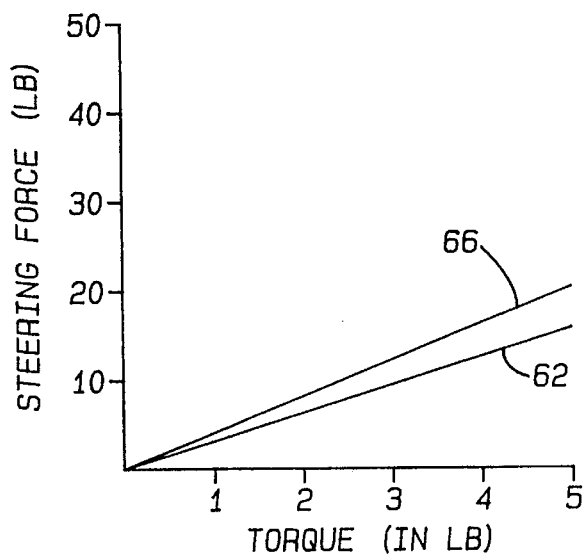

As noted hereinabove, the "prior art" power steering control valve described in SAE Paper 880707 includes a parallel high speed circuit which generally results in minimal hydraulic gain at low and moderate applied torque values when fully activated at high speeds. This is accomplished via utilization of a parallel set of tangentially extended control orifices which require greater valve deflection values to activate. Comparison data with respect to that shown in FIGS. 4A and 4B is shown in FIGS. 4C and 4D wherein curve 66 depicts the total steering force derived as a function of applied torque under static conditions and curves 68a, 68b, 68c and 68d depict the total steering force derived as a function of applied torque for rotational velocities of the steering wheel equalling +1 [rev/sec], +2 [rev/sec], −1 [rev/sec] and −2 [rev/sec], respectively. As can be seen in FIG. 4D, the relatively small difference between curve 66 and line 62 indicates that minimal values of hydraulic gain result in minimal steering assist at low values of applied torque. However, the tightly grouped family of curves 68a, 68b, 68c and 68d, and line 62 are also indicative of minimal assist levels right up to about 30 [in-lb] of applied torque. Because the system uses a torsion bar having a known torsional stiffness there is a concomitant control valve error angle (typically about 1.8°) which must be overcome before any useful steering assist occurs. Furthermore, the highly grouped nature of the various curves implies minimal characteristic damping (as depicted by lateral distance between the various curves) of the system. Both conditions are indicative of a power steering system that is susceptible to externally imposed transient loading. Symptoms generally include undue sensitivity to side wind loading and difficulty in tracking when ruts or streetcar tracks are encountered.

Figure 5A:
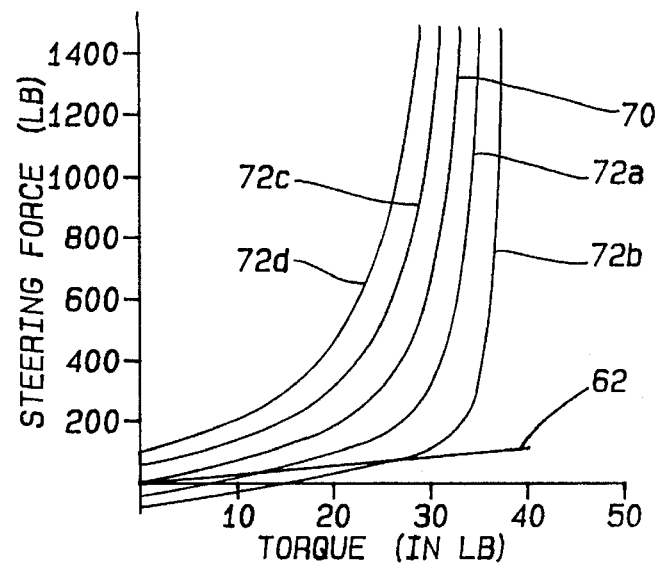
FIGS. 5A, 5B, 5C and 5D are exemplary graphs depicting the performance characteristics of a conventional speed controlled power steering system utilizing an electronically variable orifice ("EVO") valve.
Figure 5B:
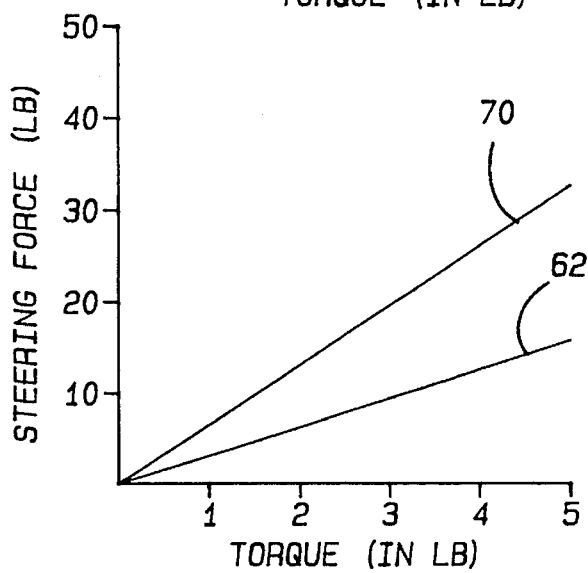

Also mentioned above was the utilization of an EVO (electronically variable orifice) valve to achieve "speed sensitive" steering. A similar array of curves 70, 72a, 72b, 72c and 72d depicting static, +1 [rev/sec], +2 [rev/sec], −1 [rev/sec] and −2 [rev/sec] respective values of rotational motion of the steering wheel is shown in FIG. 5A for a conventional EVO equipped power steering system in its low speed, or full fluid supply flow mode. These curves, as well as magnified segments of curve 70 and line 62 shown in FIG. 5B, depict a less effective, but generally similar low speed performance to that shown in FIGS. 4A and 4B.

Figure 5C:
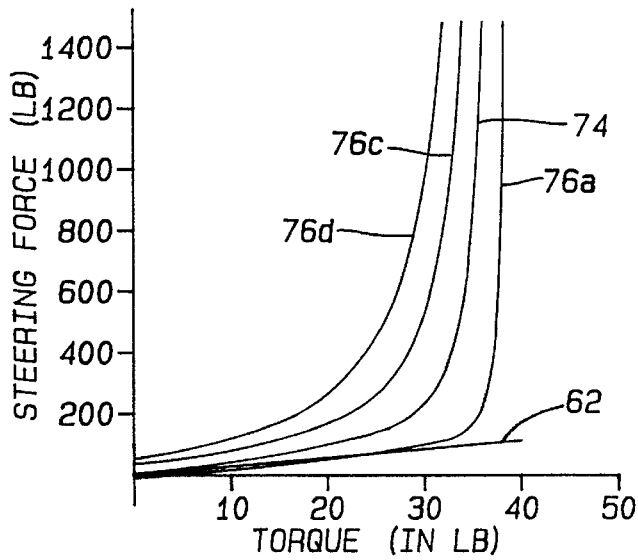
Figure 5D:
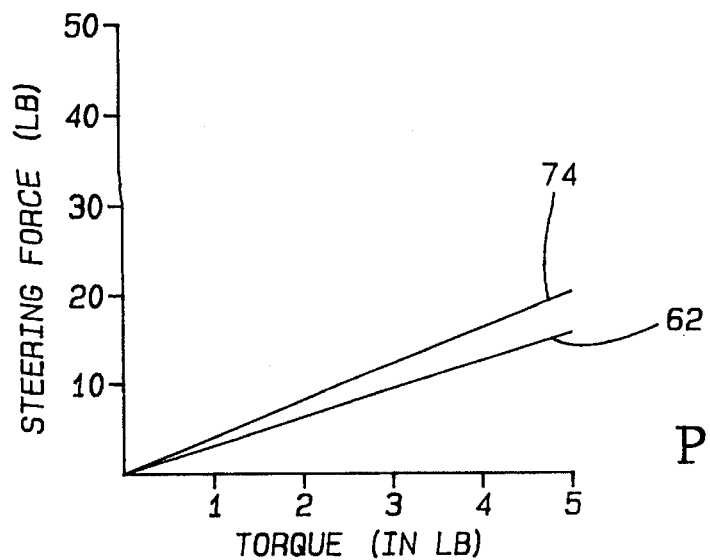

In addition, exemplary curves 74, 76a, 76c and 76d of FIGS. 5C and 5D show static, +1 [rev/sec], −1 [rev/sec] and −2 [rev/sec] values of rotational motion of the steering wheel, respectively, for a conventional EVO equipped power steering system at high vehicular speeds. Again, these curves depict performance characteristics that are more-or-less similar to that shown in FIGS. 4C and 4D. However, the lack of an equivalent +2 [rev/sec] curve (i.e., to curve 68b) reveals a problem inherent with EVO equipped power steering systems. Since the EVO valve functions to reduce the fluid supply flow rate, the potential exists that sufficient flow may not be available to service high steering wheel rotational motion rates. Thus, it would not be possible to execute an evasive maneuver commonly referred to as an "accident avoidance maneuver" without encountering another symptom commonly referred to as "pump catch" wherein the fluid flow is unable to provide for concomitant displacement of the system's power cylinder. In this condition, the vehicle operator momentarily encounters a sharp increase in resistance to steering motion and may be unable to fully execute the intended maneuver. Thus, with EVO equipped power steering systems it is generally necessary to provide detection capability for detecting rapid steering wheel motions and for opening the EVO (i.e., similar to the setting it has at low speed) in response thereto. Unfortunately, the vehicle operator will suddenly encounter overly light steering during the emergency maneuver.

Figure 6A:
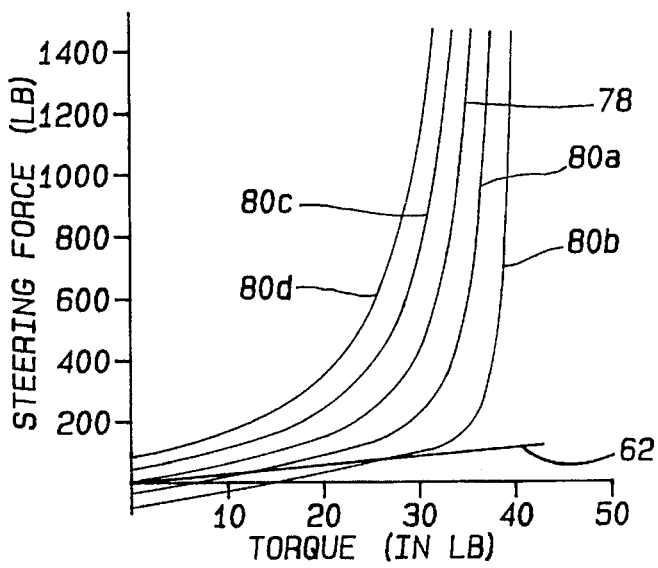
FIGS. 6A and 6B are exemplary graphs depicting the performance characteristic of a power steering system equipped with an open-center control valve having the improved valving sub-assembly shown in FIG. 1.
Figure 6B:
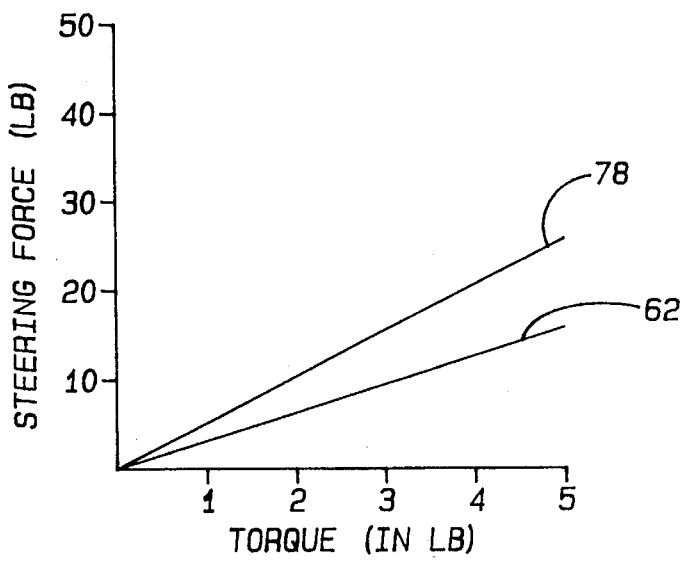

By way of contrast, curves 78, 80a, 80b, 80c and 80d of FIGS. 6A and 6B depict the superior performance of a power steering system equipped with valving sub-assembly 10 for static, +1 [rev/sec], +2 [rev/sec], −1 [rev/sec] and −2 [rev/sec] values of rotational velocity of the steering wheel, respectively. In this example, no speed sensitive feature is utilized. As can be seen, FIG. 6A shows a family of well behaved curves with excellent applied torque modulation with respect to both steering force levels and steering wheel rotational velocity levels. Likewise, FIG. 6B depicts a generally tangential relationship between curve 78 and line 62 at an applied torque value of zero. This is due to the fact that the hydraulic resistance presented by the sets of first and second parasitic orifices 56a and 56b, respectively, does not have a constant value. Because flow through an ideal orifice is proportional to the square root of the pressure loss therethrough, the hydraulic resistance is proportional to flow rate. And, because under static conditions there is zero flow rate at zero applied torque (due to a zero value of pressure across the orifice), it follows that the hydraulic resistance also has a substantially zero value and virtually no pressure gradient can be developed until off center conditions prevail. In any case, the resulting hydraulic gain of valving sub-assembly 10 at zero applied torque is substantially zero which results in desirable on-center "feel". However, hydraulic gain and power steering "assist" substantially recover to meaningful values at an applied torque level of about 5 [in-lb]. Thus, a control valve error angle of only about 0.3 [deg], or about one-sixth of that of the two circuit speed sensitive system described above is required in order to achieve useful steering assist.

Figure 2B:
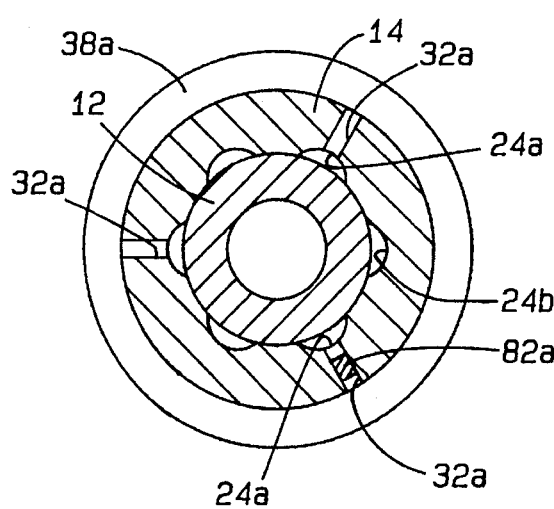
FIGS. 2B and 2C are sectional views taken through the output ports of the valving sub-assembly shown in FIG. 1.
Figure 2C:
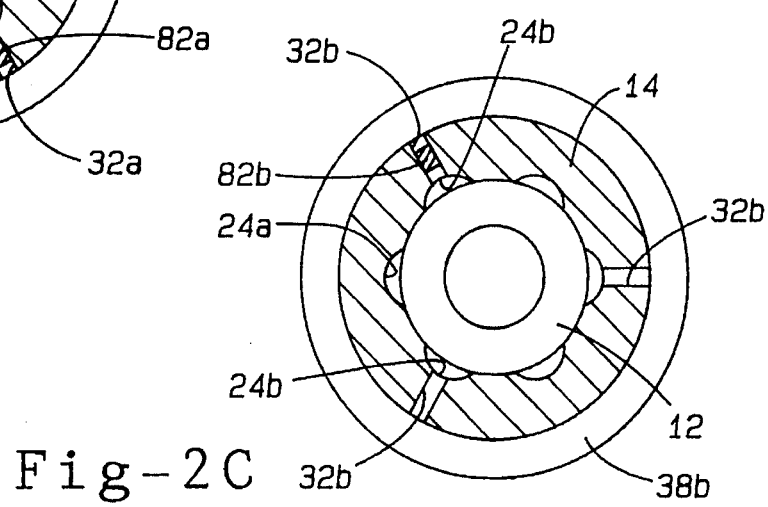
Figure 3:
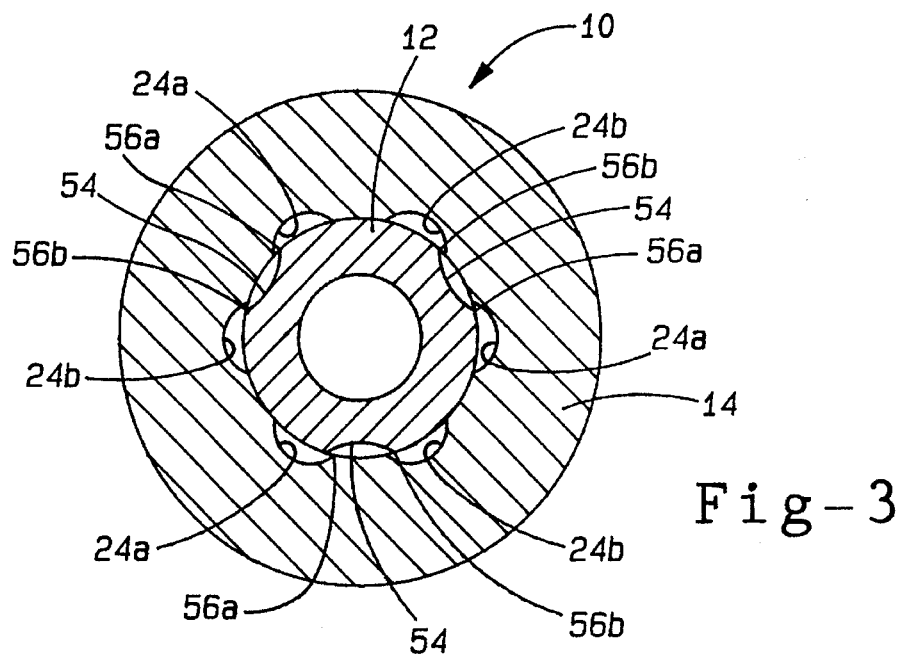
FIG. 3 is a sectional view illustrating the leakage slots and the parasitic orifice configuration associated therewith as incorporated into the improved valving sub-assembly shown in FIG. 1.
Figure 6C:
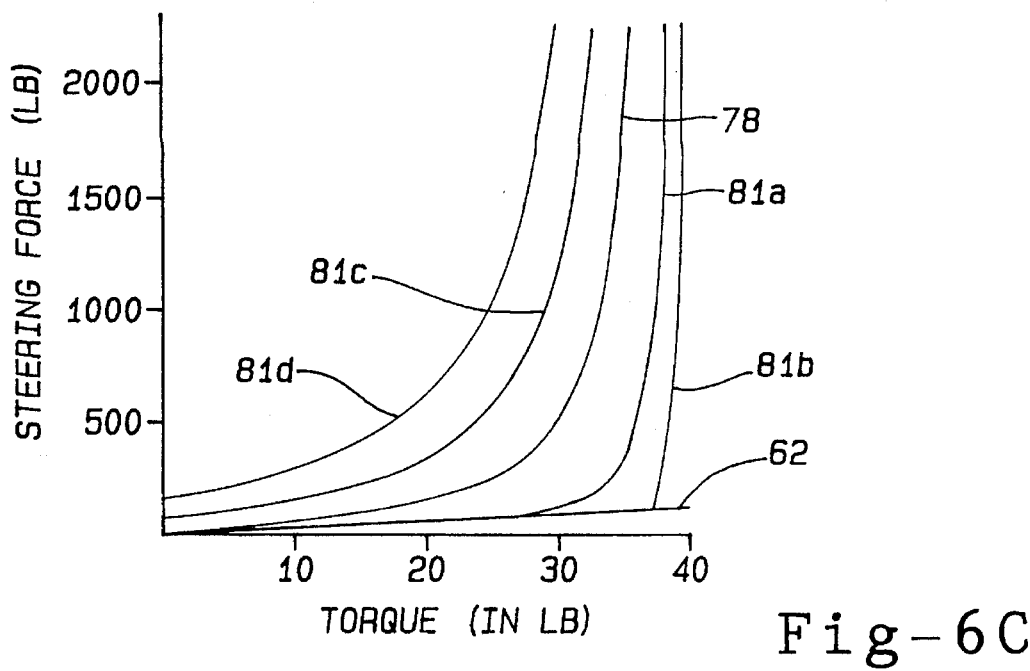
FIGS. 6C and 6D are exemplary graphs depicting the performance characteristics of a control valve having a valving sub-assembly modified as shown in FIGS. 2B and 2C.
Figure 6D:
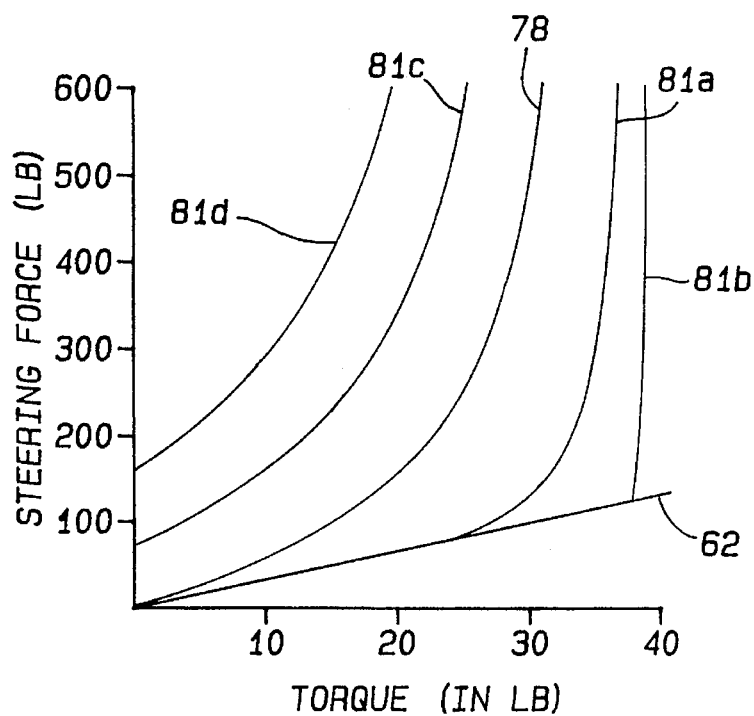

With reference to FIGS. 2B and 2C, it can be seen that one (or more for that matter) of the first and second output ports 32a and 32b, respectively, may optionally be blocked by first and second plugs 82a and 82b, respectively. The effect of doing this is to further spread curves 80a, 80b, 80c and 80d with respect to the location of curve 78. More particularly, curves 81a, 81b, 81c and 81d of FIGS. 6C and 6D depict the performance of a power steering system equipped with valving sub-assembly 10 for static, +1 [rev/sec], +2 [rev/sec], −1 [rev/sec] and −2 [rev/sec] values of steering wheel rotational velocity, respectively, with at least one of output ports 32a and 32b "blocked-off" in the manner shown. As can be been, the result is a further increase in the above mentioned applied torque modulation with respect to both steering force levels and steering wheel rotational velocity levels. Also, FIG. 6D illustrates the largely tangential relationship between curve 78 and line 62 at an applied torque value of zero. As will be appreciated, instead of "blocking off" the ports using plugs, the actual number of radial ports bored into valve sleeve 14 may be varied during the manufacturing process.

Figure 7:
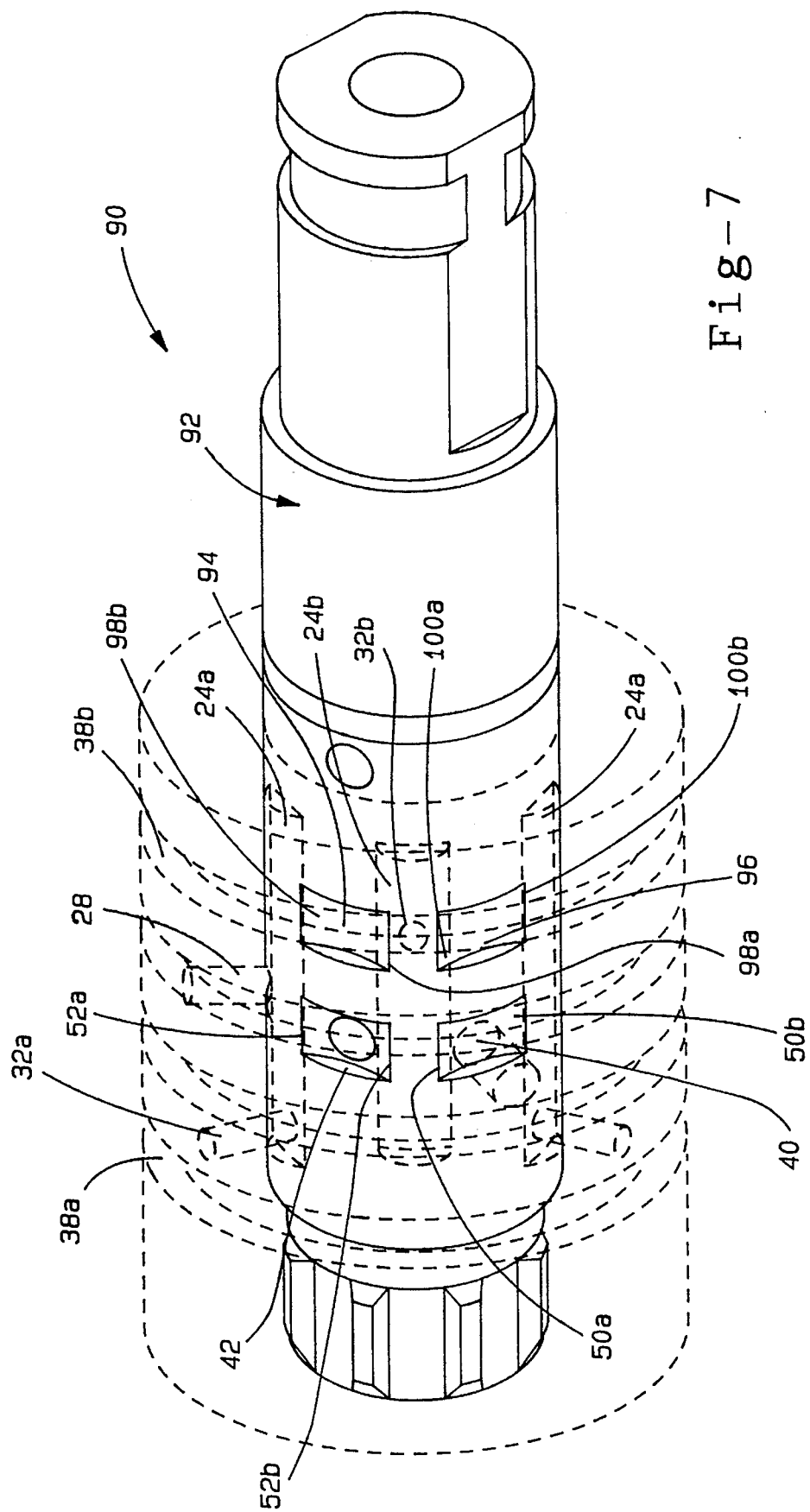
FIG. 7 is a perspective view of an improved valving sub-assembly constructed according to an alternative embodiment of the present invention.
Figure 8:
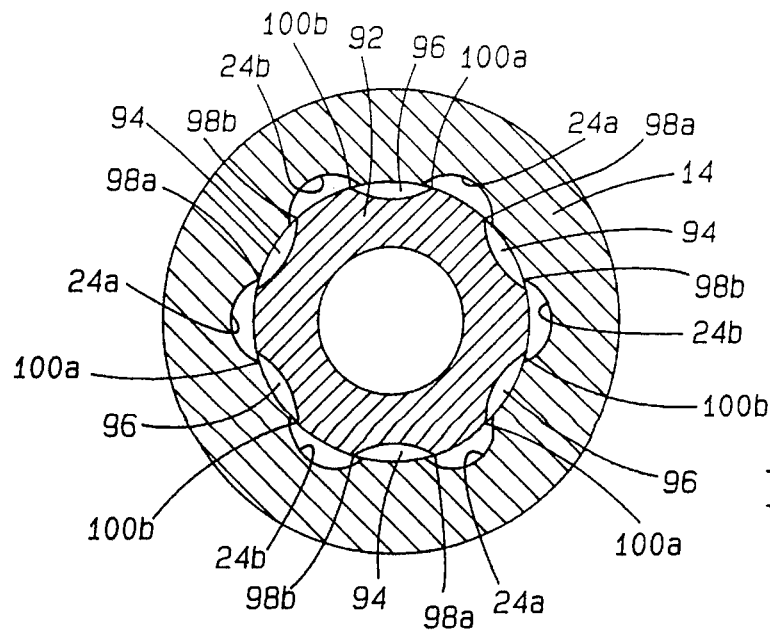
FIG. 8 is a sectional view illustrating the leakage slots and the parasitic orifice configuration associated therewith as incorporated into the valving sub-assembly shown in FIG. 7.

With reference now to FIGS. 7 and 8 of the drawings, a valving sub-assembly 90 is shown to include valve spool 92 and valve sleeve 14 (again shown in phantom in FIG. 7) which is constructed according to an alternate embodiment of the present invention. Generally, the hydraulic fluid flow path is the same as that shown above with relation to valving sub-assembly 10 and, where appropriate, like reference numbers are used to identify the various elements of valving sub-assembly 90 similar to those previously disclosed. However, in valve sub-assembly 90, parasitic fluid flow is handled by alternating sets of first and second parasitic slots 94 and 96, respectively, wherein a first set of first and second parasitic orifices 98a and 98b, respectively, is associated with the first parasitic slots 94 and a second set of first and second parasitic orifices 100a and 100b, respectively, is associated with the second parasitic slots 96. The first and second sets of parasitic slots 94 and 96, respectively, are offset from one another in a hydraulically symmetrical manner between first and second output slots 24a and 24b, respectively, such that first parasitic orifices 98a and 100a are equal in size but smaller than second parasitic orifices 98b and 100b which are also equal in size. Usually one or both sets of input flow control orifices 50a and 50b, and return flow control orifices 52a and 52b have tangential lengths greater than the first parasitic orifices 98a and 100a but less than the second parasitic orifices 98b and 100b.

In response to clockwise deflection of valve spool 92 with respect to valve sleeve 14, parasitic fluid flow through first parasitic slots 94 is shut off first when parasitic orifices 98a closes while parasitic flow through second parasitic slots 96 continues even after first input and return flow control orifices 50a and 52a, respectively, have already closed. Conversely, in response to counterclockwise deflection of valve spool 92 relative to valve sleeve 14, parasitic fluid flow through second parasitic slots 96 is shut off first upon closing of parasitic orifices 100b while parasitic flow through first parasitic slots 94 continues even following closure of second input and return flow control orifices 50b and 52b, respectively. Altering the parasitic flow function in this manner gives the valve designer an added degree of freedom in determining specific performance characteristics of a power steering system utilizing valving sub-assembly 90.

Figure 9A:
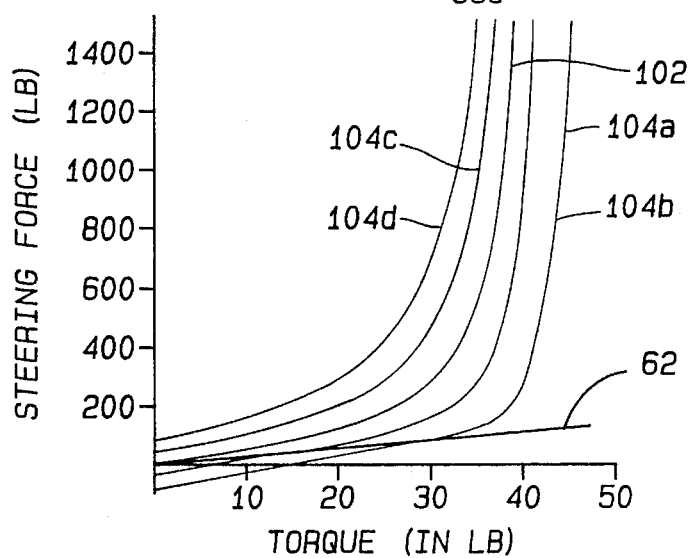
FIGS. 9A and 9B are exemplary graphs depicting the performance characteristic of a power steering system equipped with an open-center flow control valve having the valving sub-assembly shown in FIG. 7.
Figure 9B:
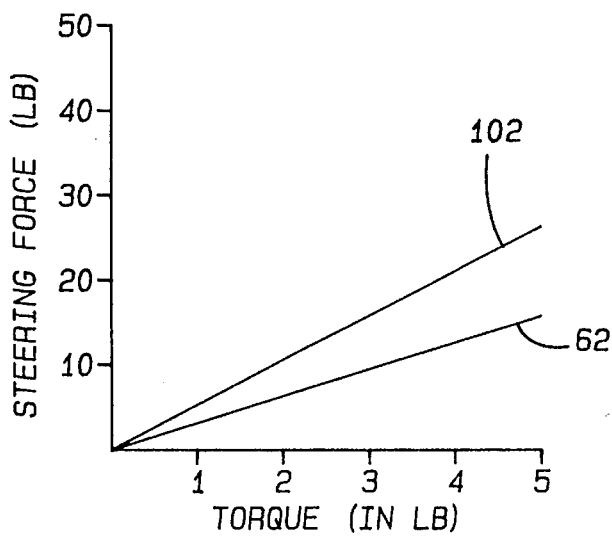

FIGS. 9A and 9B depict the performance of a power steering system equipped with valving sub-assembly 90 wherein the flexibility to increase applied torque values needed to achieve maximum positive direction steering wheel rotational velocities is clearly shown. In FIGS. 9A and 9B curves 102, 104a, 104b, 104c and 104d depict total steering force derived as a function of applied torque for static, +1 [rev/sec], +2 [rev/sec], −1 [rev/sec] and −2 [rev/sec] values of rotational motion of the steering wheel, respectively. Generally curves 102, 104a, 104c and 104d are similar to those seen before in FIGS. 6A and 6B. However, curve 104b is more-or-less uniformly displaced toward the right of FIG. 9A, thus implying that larger values of applied torque are required in order to achieve a rotational velocity of +2 [rev/sec], as desired.

As can be seen from FIG. 1, inlet slots 40, return slots 42 and leakage slots 54 are all formed to have a generally rectangular edge profile. As such, their respective flow control orifices and/or parasitic orifices have a linearly increasing area as defined by tangential movement of their parallel overlapping edges with output slots 24a and 24b. As previously stated, the performance characteristics of valving sub-assembly 10 can be selectively customized by varying the particular size and/or contour of inlet slots 40, return slots 42 and parasitic slots 54 which, in turn, defines the specific orifice geometry for input orifices 50a and 50b, return orifices 52a and 52b, and parasitic orifices 56a and 56b, respectively. Accordingly, the present invention is directed to the disclosure of several modified constructions for valve spool 12 wherein the edge profiles of the various slots define non-linearly determined area values for their respective flow control orifices and/or parasitic orifices. Where appropriate, like numbers are used to identify previously disclosed elements while primed numbers are used for identifying those elements having been slightly modified. It should be understood that the particular size, contour and combination of slots shown hereinafter are intended to be merely exemplary in nature. Likewise, it should be understood that while the modifications are discussed with reference to valving sub-assembly 10 that they are likewise applicable to valving sub-assembly 90 shown in FIG. 7.

Figure 10A:
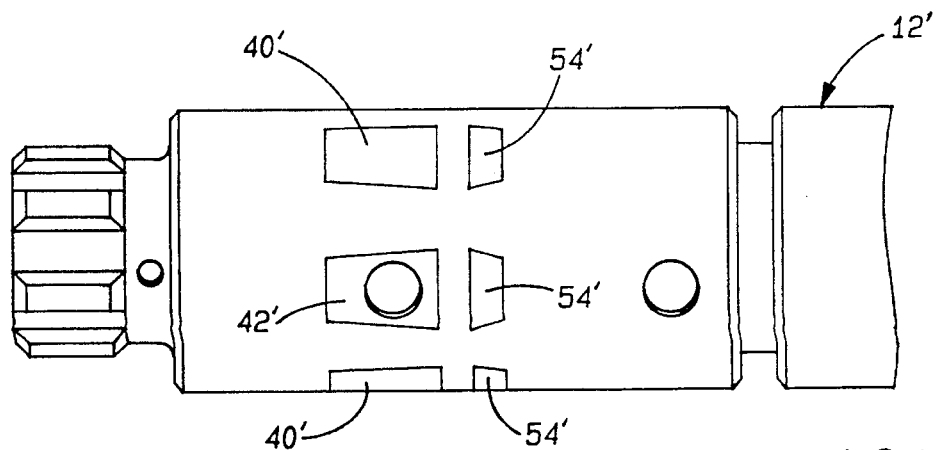
FIG. 10A is a partial elevational view of a valve spool that can be used in the improved valving sub-assembly shown in FIG. 1 having the specific configuration of its inlet slots, return slots and parasitic slots modified according to yet another embodiment of the present invention.
Figure 10B:
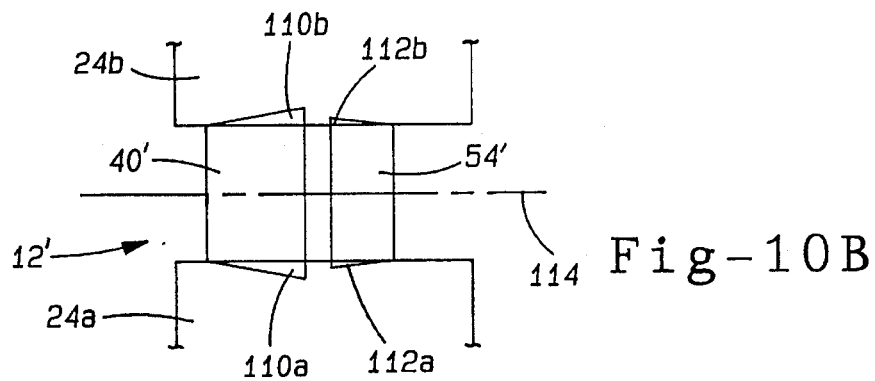
FIG. 10B schematically illustrates the orifice profiles associated with the valve spool shown in FIG. 10A.

With particular reference to FIGS. 10A and 10B, a valve spool 12' is shown that can be readily substituted for valve spool 12 in valving sub-assembly 10 for use in an open-center control valve of a motor vehicle power steering system. As can be seen, inlet slots 40', return slots 42' and leakage slots 54' are formed to have a trapezoidal edge profile. As such, input flow control orifices 110a and 110b and parasitic orifices 112a and 112b have a generally triangular area configuration relative to their juxtaposition with output slots 24a and 24b, respectively. As will be appreciated, the return flow control orifices (not shown) associated with trapezoidal return slots 42' would likewise have a generally triangular contour relative to output slots 24a and 24b. In the particular embodiment shown, the circumferential or tangential length of inlet slots 40' is slightly greater than that of leakage slots 54'. However, as noted, the tangential length and, in turn, the orifice area is a design choice which can be varied to produce the desired valve performance characteristics. While inlet slots 40' and leakage slots 54' are shown to be symmetrical about reference line 114, they can be offset tangentially therefrom to again produce a desired performance characteristic.

Figure 11A:
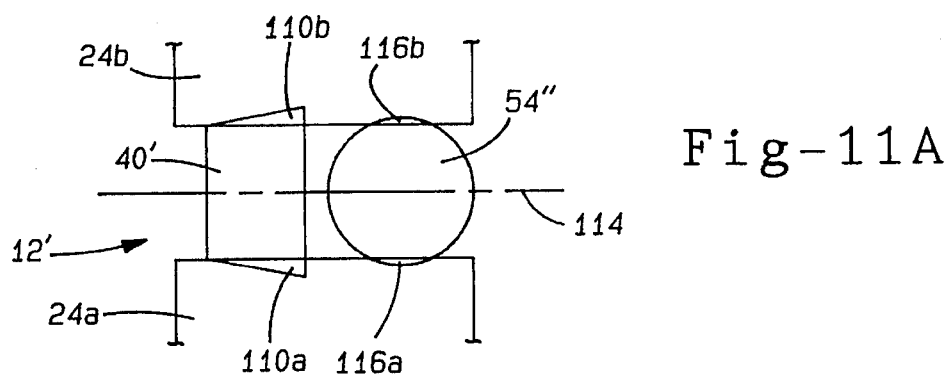
FIGS. 11A through 11H are schematic illustrations of alternative orifice configurations.
Figure 11B:
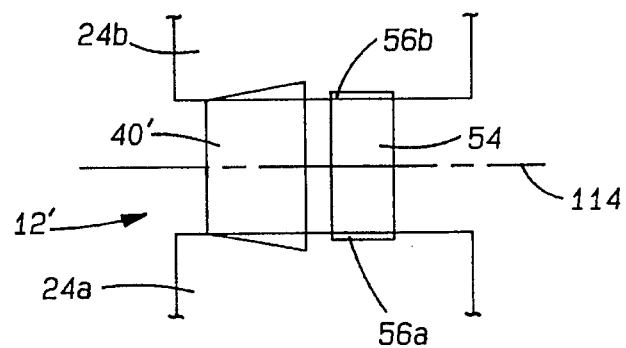
Figure 11C:
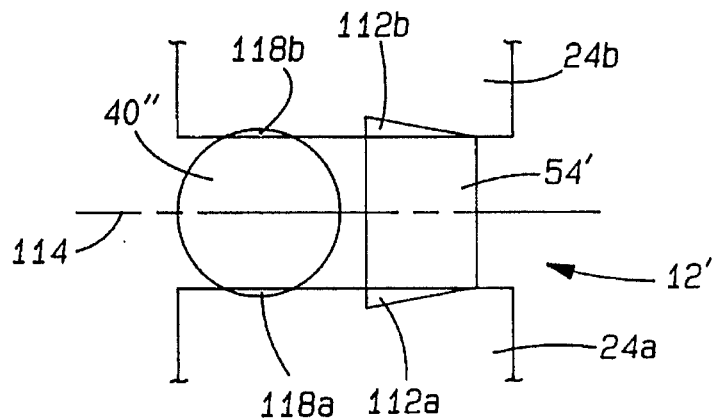
Figure 11D:
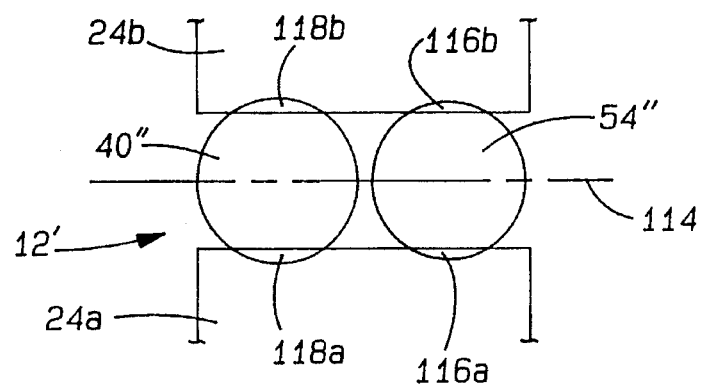
Figure 11E:
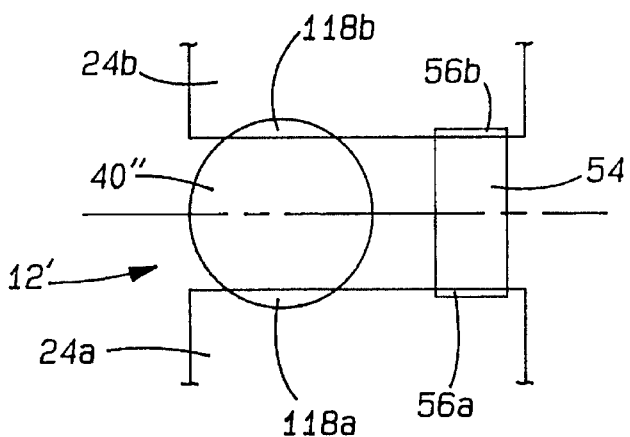
Figure 11F:
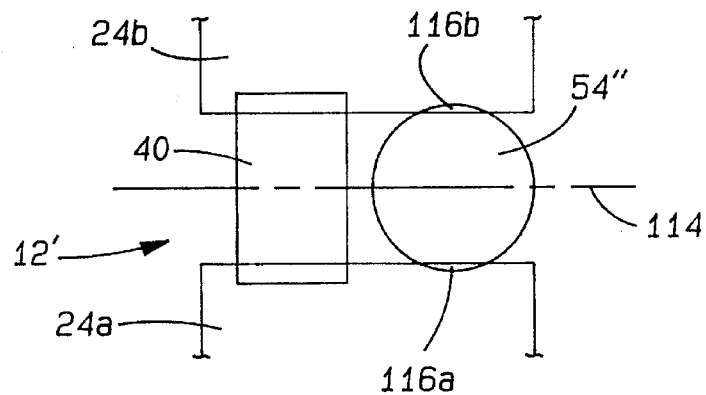
Figure 11G:
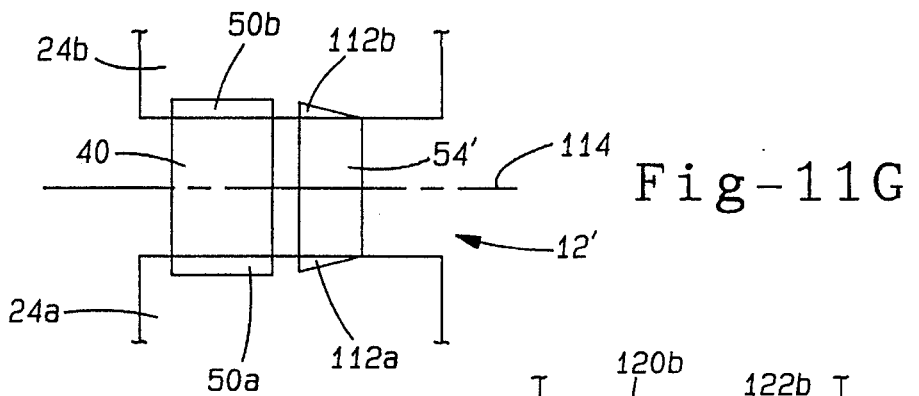
Figure 11H:
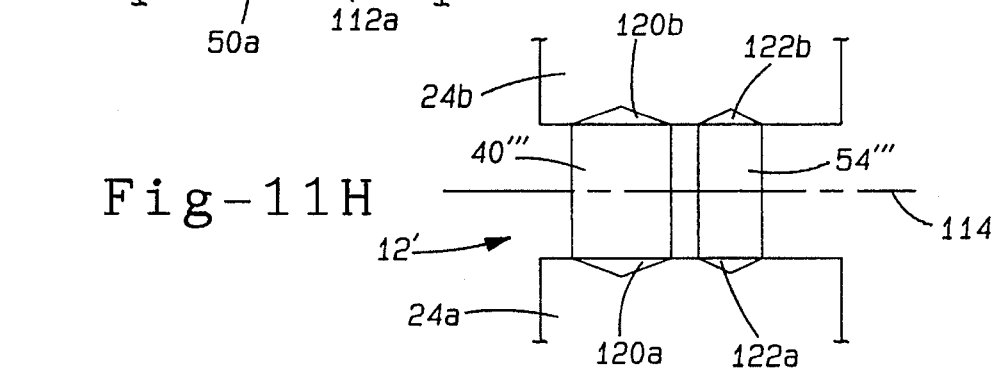

With particular reference now to FIGS. 11A through 11H, various alternative edge profile combinations for inlet slots 40', return slots 42' and leakage slots 54' are schematically shown. In general, each embodiment is directed to the disclosure of a combination of inlet/return slots and leakage slots which includes at least one non-linearly determined orifice area value relative to the overlapping lateral edges of output slots 24a and 24b. In particular, FIGS. 11A and 11B show trapezoidal inlet slots 40' in combination with leakage slots 54" having a circular edge profile and leakage slots 54 having rectangular edge profile, respectively. As such, circular leakage slots 54" define sets of arcuate parasitic orifices 116a and 116b while rectangular leakage slots 54 define sets of linear orifices 56a and 56b. FIGS. 11C through 11E illustrate circular inlet slots 40" in combination with trapezoidal leakage slots 54', circular leakage slots 54" and rectangular leakage slots 54, respectively. As such, circular inlet slots 40" define sets of arcuate flow control orifices 118a and 118b that function in association with triangular parasitic orifices 112a and 112b, arcuate parasitic orifices 116a and 116b, and linear orifices 56a and 56b, respectively. FIGS. 11F and 11G disclose the combination of rectangular inlet slots 40 with circular and trapezoidal leakage slots 54" and 54', respectively. Finally, FIG. 11H illustrates the application of inlet slots 40''' and leakage slots 54''' having generally hexagonal edge profiles which define triangular flow control orifices 120a and 120b and triangular parasitic orifices 122a and 122b, respectively. Thus, according to all the various examples shown, the tangential configurations of the flow control orifices and/or parasitic orifices and thus their rate of change in cross-sectional area will vary non-linearly in response to tangential motion of valve spool 12' with respect to valve sleeve 14 depending upon the specific combination and geometry chosen for the inlet, return, and parasitic slots formed therein. As will be appreciated, utilization of any of the modified valve spools 12' within valving sub-assembly 10 would generate suitably customized performance characteristics resembling the superior characteristic shown in FIGS. 6A and 6B.

Figure 12:
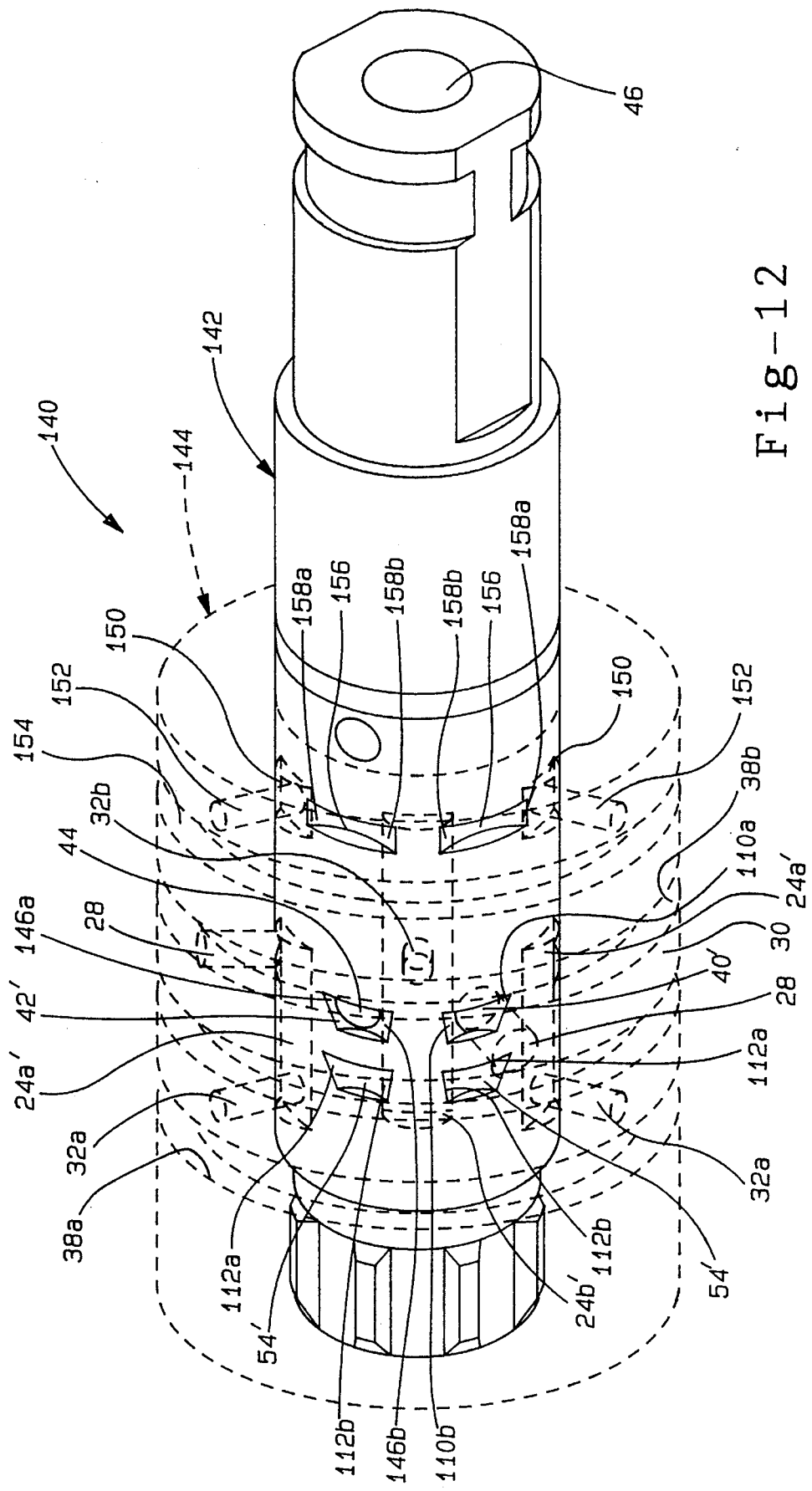
FIG. 12 is a perspective view of a further modified construction of the improved valving sub-assembly that is adapted for use in an improved "speed-sensitive" variable-assist power steering system.

With reference now to FIG. 12 of the drawings, a valving sub-assembly 140 is shown to include a valve spool 142 and a valve sleeve 144 (again shown in phantom) which is constructed according to yet another embodiment of the present invention. In general, valving sub-assembly 140 is a modified version of valving sub-assembly 10 which incorporates a secondary flow path between the valve sleeve output slots for use in a "speed-sensitive" variable-assist power steering system which preferably includes a second set of parasitic flow orifices. The secondary flow path may be used in conjunction with either an otherwise standard open-center control valve or any of the open-center control valves having substantially zero hydraulic flow gain at zero deflection angle described hereinabove (i.e., control valves having a primary set of parasitic flow orifices). Again, like and primed numbers are used to identify those elements previously disclosed. As will be described, the present invention overcomes the disadvantages associated with conventional EVO speed-sensitive systems which typically operate by selectively varying the fluid supply flow rate to a conventional control valve. Moreover, the speed-sensitive power steering system of the present invention does not regulate or redistribute supply flow but rather is operable to permit concurrent parallel flow through the primary and secondary flow paths in response to the vehicular speed exceeding a predetermined maximum value. As a result, at high vehicular speeds minimal hydraulically derived steering "assist" is generated at low and moderate input torque values such that for any given amount of steering "assist" a concomitantly greater input torque is required.

With continued reference to FIG. 12, hydraulic fluid enters valving sub-assembly 140 from the pump (not shown) via circumferential groove 30 and the plurality of radial input ports 28 formed in valve sleeve 144. Fluid then flows through the identically numbered plurality of inlet slots 40' formed in valve spool 142 to the identically numbered pluralities of first and second output slots 24a' and 24b', respectively, formed in valve sleeve 144 via first and second input flow control orifices 110a and 110b, respectively. Any load flow demanded by the speed-sensitive power steering system is delivered through one set of first and second radial output ports 32a and 32b, respectively, and its corresponding one of first and second circumferential grooves 38a and 38b, respectively, and its respective housing output port (not shown) to its respective one of load lines 34a and 34b (see FIG. 2A). Concurrently, the flow returning from the other of load lines 34a and 34b enters the control valve through the other of the housing output ports, the other of first and second circumferential grooves 38a and 38b, respectively, and the other of first and second output ports 32a and 32b, respectively. Thereafter, the returning flow passes through first and second return flow control orifices 146a and 146b, respectively, to the identically numbered plurality of return slots 42'. Finally, the returning fluid flows through exhaust ports 44 and internal chamber 46 wherefrom it flows through a housing return port (not shown) to the reservoir.

Valving sub-assembly 140 is depicted as having a primary set of parasitic leakage slots 54' and, as such, is similar to valving sub-assembly 10 in that parasitic fluid flow is also allowed to flow between first and second valve output slots 24a' and 24b', respectively, via parasitic leakage slots 54' and sets of primary parasitic orifices 112a and 112b. The sets of primary parasitic orifices 112a and 112b are formed by overlapping lateral edge portions of parasitic slots 54' and first and second output slots 24a' and 24b', respectively. As noted, the length of parasitic slots 54' is selected such that respective ones of primary parasitic orifices 112a or 112b, effectively limit parasitic flow upon closing of the controlling ones of input flow control orifices 110a or 110b and/or return flow control orifices 146a or 146b in response to deflection of valve spool 142 relative to valve sleeve 144. Hereinafter, the above-noted fluid flow path through the primary parasitic orifices 112a and 112b will be referred to as the "primary" parasitic flow path.

While the significant advantages in power steering performances associated with utilization of flow control valving having the unique primary flow path were previously discussed in comparison to conventional "speed-sensitive" control systems (see FIGS. 4A through 4D and FIGS. 5A through 5D compared to FIGS. 6A through 6D) a "speed-sensitive" power steering system equipped with sub-assembly 140 produces performance characteristic that reflect even greater superiority. To this end, valving sub-assembly 140 includes a "secondary" flow path which selectively interconnects output slots 24a' and 24b' via sets of secondary parasitic orifices 158a and 158b which are hydraulically disposed in parallel to the flow through the "primary" flow path in response to the vehicle speed exceeding a predetermined maximum value. According to a preferred construction, the secondary flow path is shown in FIG. 12 to include a set of by-pass slots 150 formed in valve sleeve 144 to be in circumferential angular alignment with output slots 24a' so as to be in an alternating relationship with output slots 24b'. As can be seen, by-pass slots 150 do not directly communicate with either of output slots 24a' or 24b'. Radial by-pass ports 152 are formed through valve sleeve 144 and fluidically couple by-pass slots 150 with an annular groove 154 which, in turn, communicates with an auxiliary port (not shown) formed in the control valve housing.

Figure 13A:
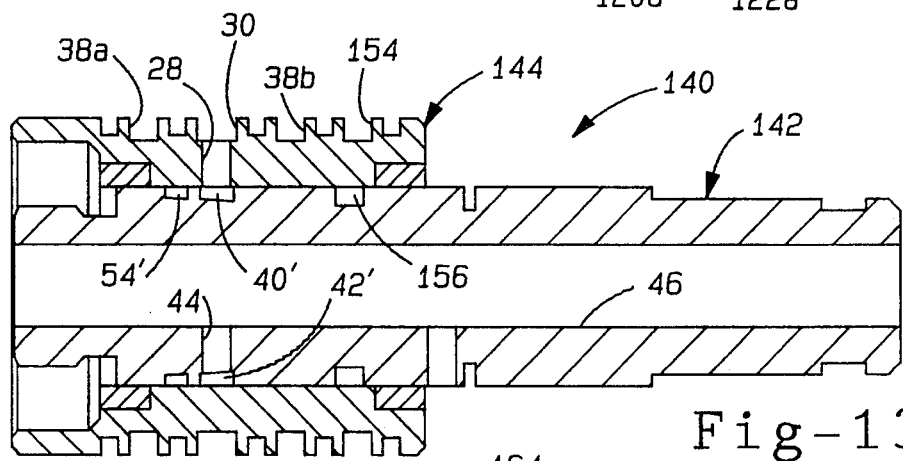
FIGS. 13A and 13B are longitudinal cross-sectional views of the valving subassembly shown in FIG. 12 with FIG. 13B including a schematic diagram of an exemplary electro-hydraulic control circuit provided for selectively controlling the "speed-sensitive" power steering system.
Figure 13B:
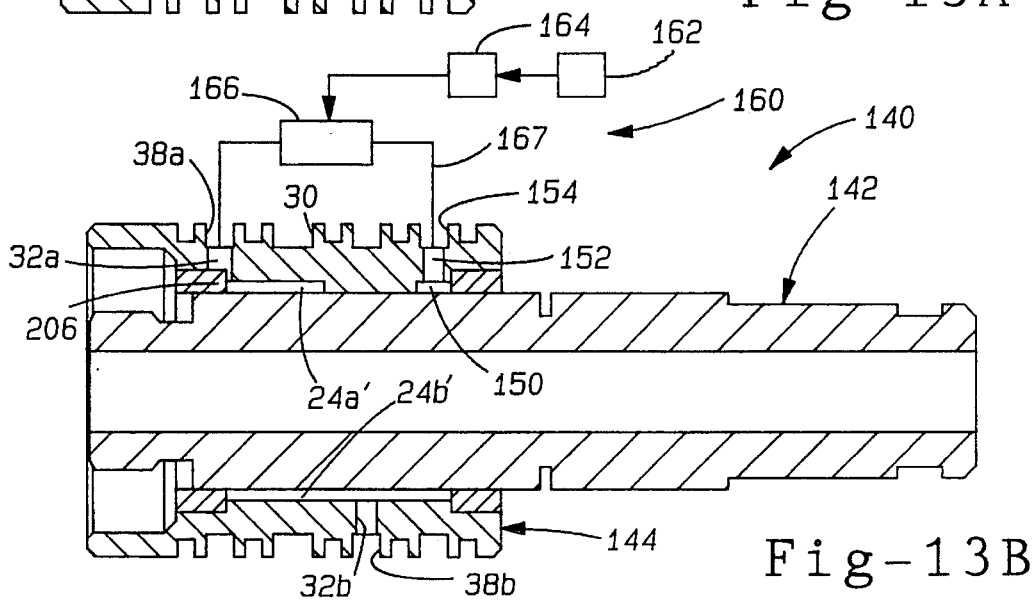

With reference to FIGS. 12, 13A and 13B the secondary flow path is also shown to include a second set of parasitic slots 156 that are circumferentially aligned with some, or all, of the first set of parasitic slots 54' and which are provided for permitting by-pass fluid flow between by-pass slots 150 and output slot 24b' via sets of secondary parasitic orifices 158a and 158b. In accordance with a preferred construction, the profile of inlet slots 40', return slots 42 and first parasitic slots 54' are similar to that shown in FIG. 10B while secondary parasitic slots 156 have a rectangular edge profile. As such, the areas of secondary parasitic orifices 158a and 158b are linearly determined with respect to relative tangential displacement of by-pass slots 150 and output slot 24b', respectively. In addition, secondary parasitic slots 156 are shown to have a greater tangential length than inlet slots 40', return slots 42' and leakage slots 54'. Again, however, the particular size and contour of the various primary and secondary orifices can be modified to selectively customize the performance of valving sub-assembly 140.

As best seen from FIG. 13B, a speed responsive valve mechanism 160 is shown in block diagram form and which is operable for selectively controlling the flow of fluid through the secondary flow path. Speed responsive valve mechanism 160 includes a speed sensor 162, a control device 164 and a flow control valve 166. More specifically, speed sensor 162 is operable to detect the speed of the motor vehicle, and control device 164 is adapted to control actuation of flow control valve 166 in response to the value of a speed signal received by control device 164 from speed sensor 162. In the particular embodiment shown, flow control valve 166 is installed within a by-pass line 167 which fluidically interconnects output ports 32a with by-pass ports 152. Therefore, at vehicular speeds below a predetermined value, flow control valve 166 is closed to inhibit the flow of by-pass leakage fluid between output slots 24a' and 24b' through the secondary flow path. As such, during low speed steering, such as during parking maneuvers, fluid flow through valving sub-assembly 140 is accomplished solely by the flow control orifices and the primary flow path. However, when the vehicle's speed exceeds the predetermined value, control device 164 opens flow control valve 166 for allowing fluid to flow through both the primary flow path and the parallel secondary flow path. Preferably, flow control valve 166 is a solenoid-actuated valve assembly. As such, the opening of flow control valve 166 may either be done step-wise or progressively. In either case, a greater amount of valve deflection is required to generate concomitant levels of hydraulically derived steering assist whenever flow control valve 166 is open. However, upon a sufficient amount of additional valve spool deflection, the controlling sets of secondary parasitic orifices 158a and 158b will progressively close and progressively block off flow through the secondary flow path, thus permitting higher load pressures to be obtained.

Flow through the parallel secondary flow path of valving sub-assembly 140 will now be described in greater detail. As best seen from FIGS. 12 and 13B, deflection of valve spool 142 in a first direction (i.e., clockwise) causes supply flow from input ports 28 to preferentially enter output slots 24b' through inlet flow control orifices 110b for delivery to output ports 32b as any required load flow. Concurrently, such load flow returning from output ports 32a enters output slots 24a' and is delivered to exhaust ports 44 of return slots 42' via return flow control orifice 146a. However, when the vehicular speed exceeds the predetermined value and flow control valve 166 is opened, some fluid is permitted to by-pass through secondary parasitic orifices 158a and 158b via second leakage slots 156, by-pass slots 150 and by-pass ports 152. Accordingly, a parallel flow path is generated. As will be appreciated, deflection of valve spool 142 in the opposite direction, during "high-speed" steering, will by-pass fluid through the parallel secondary flow path in a reverse direction.

Figure 14A:
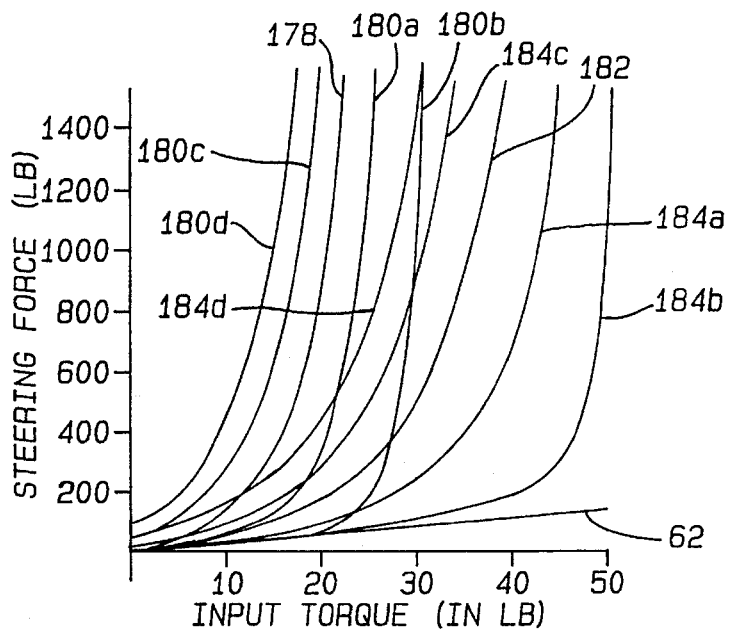
FIGS. 14A through 14C are exemplary graphs depicting the performance characteristics of the improved "speed-sensitive" power steering system equipped with a control valve having the valving sub-assembly shown in FIGS. 12, 13A and 13B.
Figure 14B:
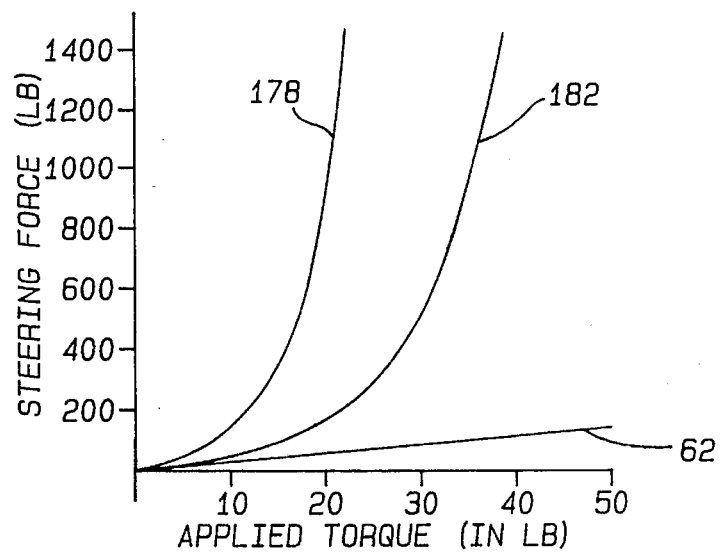
Figure 14C:
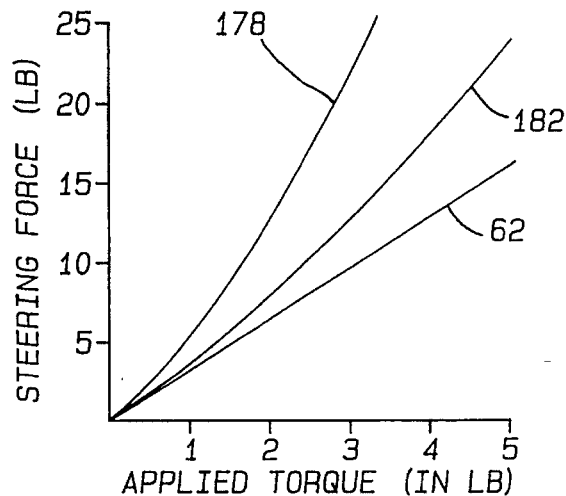

In general, the "speed-sensitive" power steering system of FIGS. 12, 13A and 13B develops superior performance characteristic compared to either of the conventional systems previously described. Exemplary performance characteristic are shown in the steering force vs. applied torque curves plotted in FIGS. 14A through 14C for the "speed-sensitive" power steering system of the present invention. More particularly, curves 178, 180a, 180b, 180c and 180d depict performance of valving sub-assembly 140 for static, +1 [rev/sec], +2 [rev/sec], −1 [rev/sec] and −2 [rev/sec] values of rotation velocity of the steering wheel, respectively, at low vehicular speeds. Thus, these curves are indicative of speed responsive valve mechanism 160 being closed such that parallel by-pass flow through the secondary flow path is prevented. Since, valving sub-assembly 140 includes the speed-sensitive feature, a second set of curves 182, 184a, 184b, 184c and 184d is indicative for performance thereof at static, +1 [rev/sec], +2 [rev/sec], −1 [rev/sec] and −2 [rev/sec] values of steering wheel rotational velocity when flow control valve 166 is fully open. The second set of curves is indicative of the performance of valving sub-assembly 140 when the vehicle speed is in excess of a predetermined value, wherein flow control device 166 is fully actuated to freely permit by-pass flow through the secondary flow path in parallel with flow through the primary flow path. As can be seen from FIG. 14A, the two families of curves are well behaved with excellent applied torque modulation relative to both steering force and steering wheel rotational velocity values. Moreover, the widely grouped nature of the high-speed curves (i.e., 182, 184a through 184d) implies a desirable characteristic damping which is effective in minimizing the system's sensitivity to externally imposed transient loadings. Finally, FIG. 14C illustrates an initial tangential relationship between curves 178 and 62 at zero applied torque for smooth steering assist in low speed (i.e., parking) maneuvers. In addition, there is depicted a relationship between curves 182 and 62 for applied torque values that is substantially identical to that shown in FIG. 6B. These relationships result in desirable on-center "feel" regardless of the vehicle's speed.

Figure 15A:
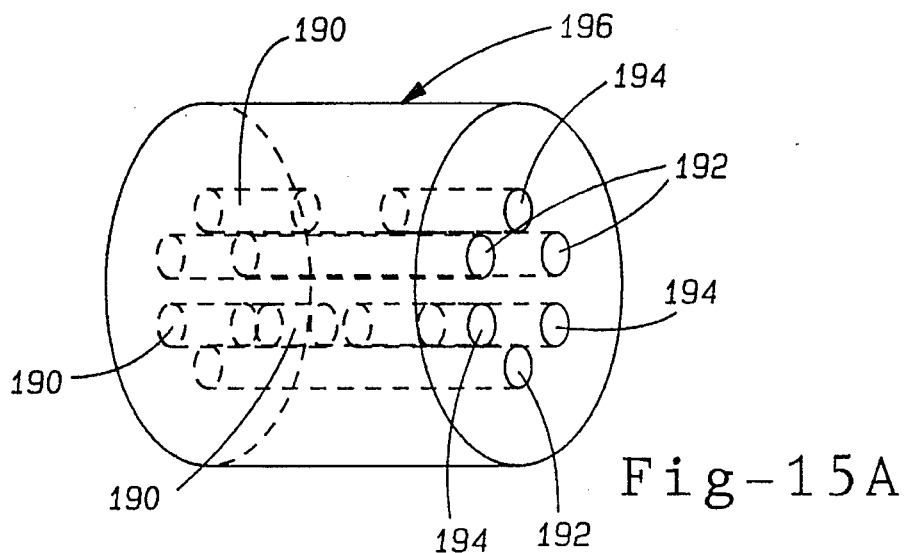
FIGS. 15A through 15C are perspective views illustrating a method for forming the slots in the valve sleeve shown in FIG. 12.
Figure 15B:
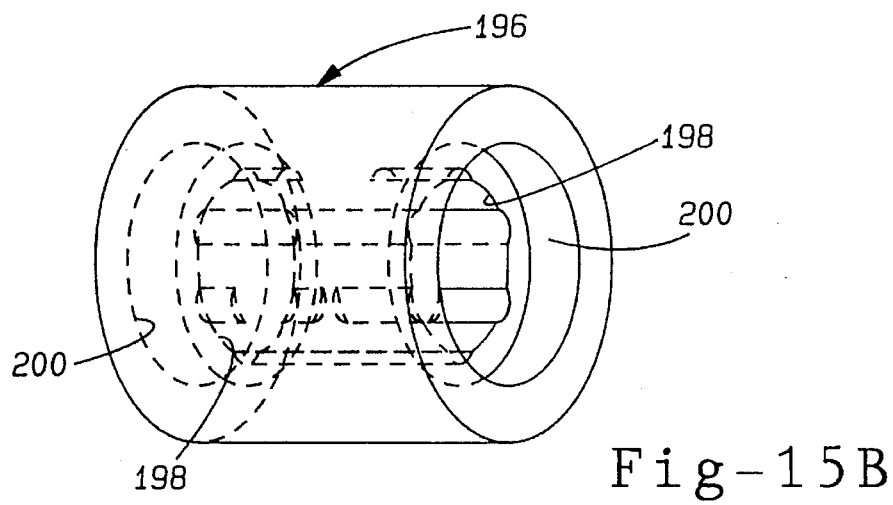
Figure 15C:
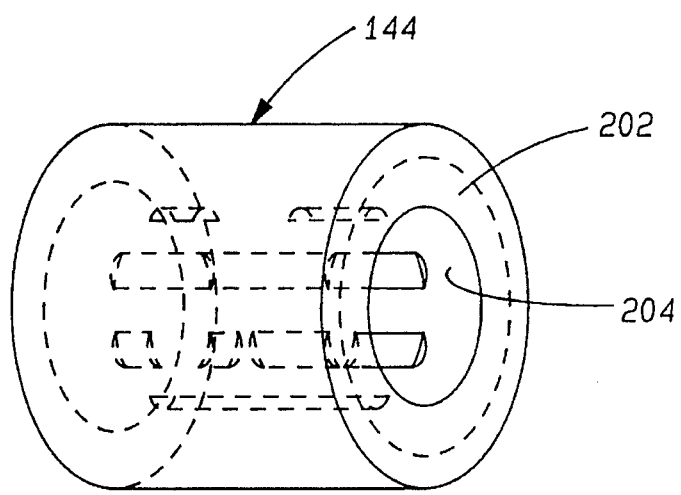

With reference now to FIGS. 15A, 15B and 15C there is illustrated a method of fabricating valve sleeve output slots 24a' and 24b' as well as by-pass slots 150 in valve sleeve 144. More particularly, a plurality of radially aligned and axially oriented cylindrical bores 190, 192 and 194 which correspond to slots 24a', 24b' and 150, respectively, are formed in a valve sleeve blank 196 as shown in FIG. 15A. As can be seen, the bores are circular in cross-section with bores 192 extending completely through blank 196 and bores 190 and 1 94 being formed as blind holes. One known method for accurately forming the holes 190, 192 and 194 is via a process known as "gun-drilling" wherein the drill is actually a boring tool that is accurately guided and is provided with an internal passage for conveying lubricating fluid to its working end, As is shown in FIG. 15B, an intermediate longitudinal bore 198 and counter bores 200 at opposite ends of blank 196 are then formed. Next, sealing rings 202 (shown in phantom) are pressed into counter-bores 200. Finally, an enlarged final bore 204 is formed through both valve sleeve blank 196 and sealing rings 202 to define valve sleeve 144 such as is shown in FIG. 15C. Thereafter, if either of sealing rings 202 pose any interference problem with either output ports 32a or by-pass ports 152, the ports in heat treated valve sleeve 144 can be used to guide a drill for boring relief into sealing rings 202 as shown in FIG. 13A at 206.

Figure 16A:
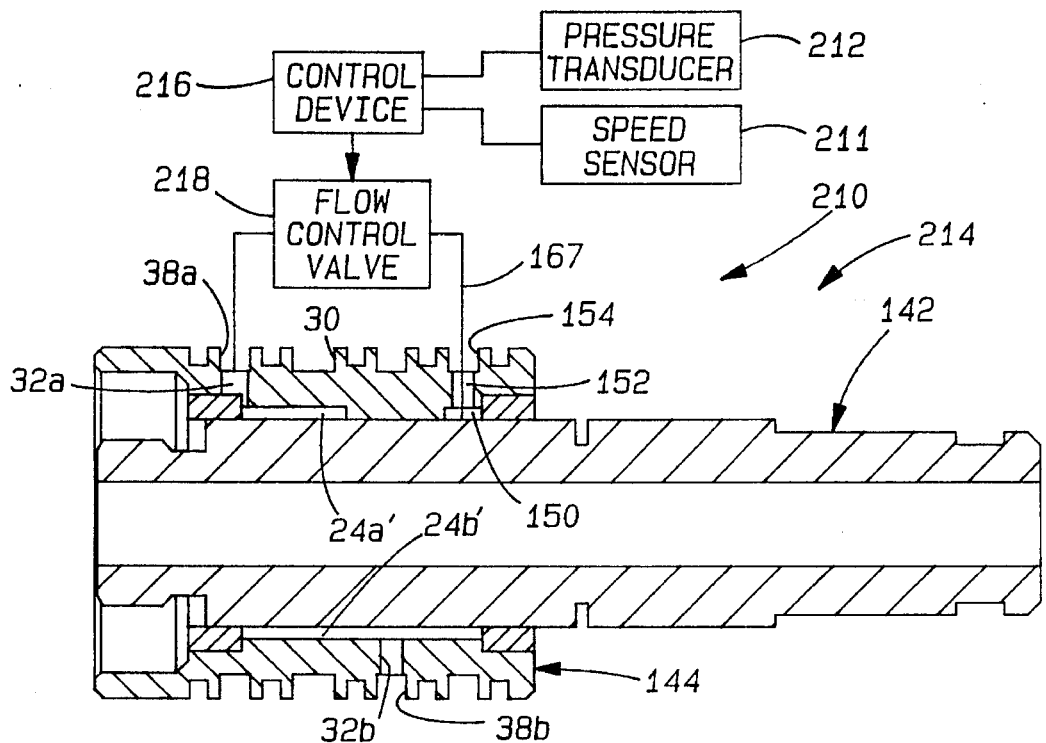
FIGS. 16A and 16B are views, similar to FIG. 13B, illustrating alternative embodiments for the improved "speed-sensitive" power steering system of the present invention.
Figure 16B:
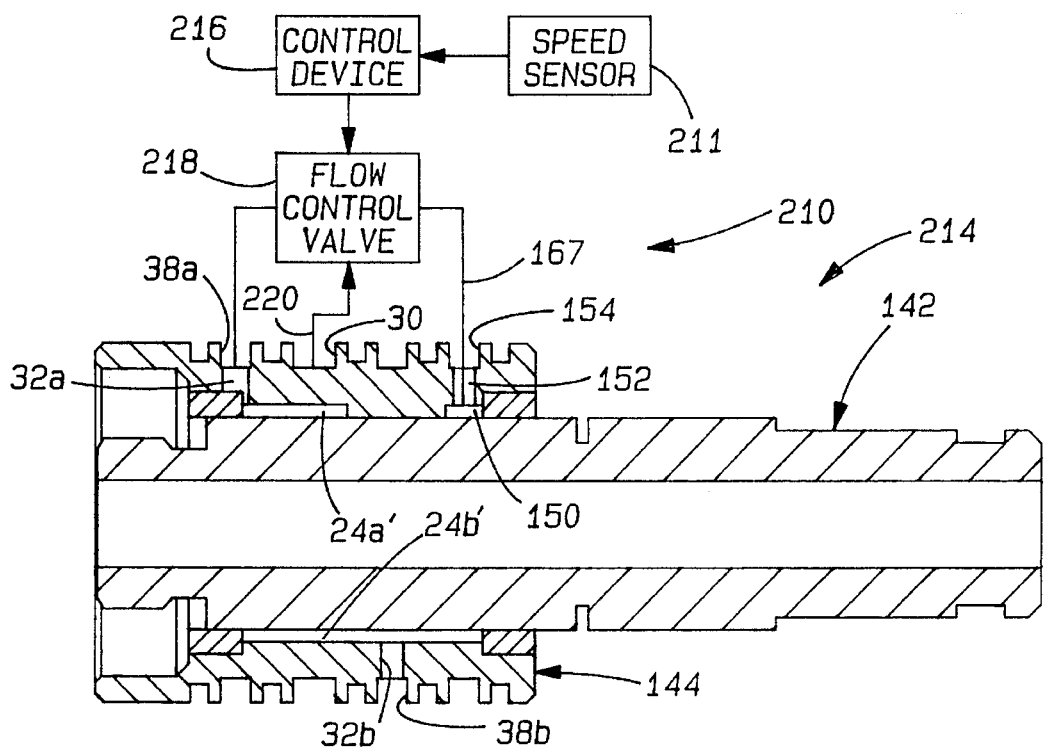

According to yet another feature of the present invention, means are provided in conjunction with the "speed-sensitive" power steering system to generate a "tactile" indication that the power steering system is approaching a predetermined limit during low-speed operation. More particularly, it is desirable during low-speed maneuvers to give the vehicle operator a physical indication that, for instance, the rack is approaching the end of its travel during a hard turn when parallel parking. Such a tactile signal can be readily provided for a speed-sensitive power steering system in a number of ways. First, as seen in FIG. 16A, speed responsive valve mechanism 210 comprising speed sensor 211 has been modified to include a pressure transducer 212 which senses the hydraulic pressure supplied to a valving sub-assembly 214. Valving sub-assembly 214 may comprise valving sub-assembly 140. Alternatively it may comprise the valving sub-assembly described in SAE Papers 880707. In any case, the signal generated by pressure transducer 212 is delivered to control device 216. When the hydraulic pressure exceeds a predetermined value, for example 100 psi less than the pump's relief valve setting, control device 216 actuates flow control valve 218 to allow fluid to flow through the secondary flow path. As such, the greater level of valve deflection and concomitant increased torque level required to generate correspondingly greater levels of hydraulic steering "assist" is tactilely felt by the vehicle operator through the steering wheel. FIG. 16B illustrates an alternative arrangement to that shown in FIG. 16A. In particular, the control valve 218 could be mechanically shifted, in opposition to a predetermined preload (i.e., such as provided by a spring member), from the normally closed position to an open position in response to the pressure of the hydraulic fluid being applied directly thereto. Such an arrangement is schematically shown such that a supply pressure line 220 is connected to flow control valve 218 for directly applying the supply pressure to a piston member additionally comprised therein (not shown). When the fluid pressure in pressure line 220 exceeds the predetermined preload, flow control valve 218 is mechanically actuated for permitting flow through the secondary flow path at low vehicular speeds. Thus, flow control valve 218 can be electrically actuated in response to high-speed signals from speed sensor 211 as described above with respect to speed responsive valve mechanism 160 and mechanically actuated in response to high valued pressure signals.

The foregoing discussion discloses and describes merely exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A speed-sensitive power steering system that is operable to selectively control the flow of hydraulic fluid to first and second input ports of a power output transducer for controlling the positioning of a mechanical device in response to a rotational input applied to a steering wheel by a vehicle operator, said speed-sensitive power steering system comprising:

an open-center control valve having flow distribution means comprising a valve sleeve having an inlet port, a return port and first and second output ports, a valve spool selectably rotatable within said valve sleeve, said control valve having a primary supply flow path communicating with said first and second output ports, and an auxiliary flow path having a leakage flow path communicating with a bypass port, said open center control valve selectively connecting said bypass port to one of said first and second output ports;

first and second load lines fluidly interconnecting said first and second output ports of said valve sleeve with said first and second input ports of said power output transducer respectively, said control valve being operable to generate a hydraulic steering assist as a function of a differential output pressure applied to said first and second load lines of said power output transducer and a differential fluid flow therebetween in response to said rotational inputs; and speed responsive means for selectively controlling the flow of fluid between said bypass port and the other of said first and second output ports in response to the speed of the motor vehicle, said speed responsive means including a valve operable to inhibit flow from said bypass port from communicating with said first and second load lines, when vehicular speeds are below a predetermined value and thereby causing said flow distribution means to generate desired low speed values of hydraulic assist, and further operable to permit flow through said auxiliary flow path in response to vehicular speeds exceeding said predetermined value for generating desired high-speed values of hydraulic assist.

2. The power steering system of claim 1 wherein said auxiliary flow path further comprises a second leakage flow path that is isolated from and fluidically coupled in parallel with said first leakage flow path when said vehicular speed exceeds said predetermined value.

3. The power steering system of claim 2 wherein said speed responsive means includes speed sensor means for sensing the speed of the motor vehicle and generating a signal in response thereto, flow control means for regulating the flow of fluid through said second leakage flow path, and control means for selectively actuating said flow control means in response to said signal generated by said speed sensor means.

4. The power steering system of claim 2 wherein said first and second leakage flow paths regulate leakage flow across said output ports of said control valve as a function of tangential motion of said valve spool relative to said valve sleeve.

5. The power steering system of claim 4 wherein said first leakage flow path includes first leakage slots formed in said valve spool that function to generate first and second leakage orifices between said first leakage slots and said output slots in said valve sleeve, and wherein said second leakage flow path includes second leakage slots formed in said valve spool for generating third and fourth leakage orifices between said second leakage slots and said first output slots and by-pass slots formed in said valve sleeve.

6. A method of controlling a power steering system in response to the speed of the motor vehicle and the rotational inputs applied to a steering wheel, said method comprising the steps of:

providing a source of hydraulic fluid;

communicating a supply flow from a supply path of an open center control valve through first and second output ports to a hydraulic actuator;

forming an auxiliary flow path between bypass port in said open center control valve and one of said first and second output ports;

supplying said hydraulic fluid to an inlet port of said open-centered control valve;

providing a variable flow of fluid through said auxiliary flow path, wherein an amount of said variable flow is determined by relative rotational position of a first valve member with respect to a second valve member;

sensing the speed of the motor vehicle;

selectively controlling the flow of fluid between said bypass port and the other of said first and second output ports in response to the speed of the vehicle to inhibit said variable flow of fluid from auxiliary flow path to the other of said first and second output ports when the speed of the motor vehicle is below a predetermined value and to permit the flow of fluid from said auxiliary flow path to the other of said first and second output ports when the speed of the motor vehicle exceeds the predetermined value.

7. The power steering system of claim 6 further comprising the step of providing a flow control valve in fluid communication with said auxiliary flow path and means for selectively controlling the flow of fluid through said flow control valve in response to the speed of the motor vehicle.

8. A power steering system that is operable to selectively control the flow of hydraulic fluid to first and second input ports of a power output transducer for controlling the positioning of a mechanical device in response to a rotational input applied to a steering wheel by a vehicle operator, said power steering system comprising:

an open-center control valve having flow distribution means comprising a valve sleeve having an inlet port, a return port and first and second output ports, a valve spool selectably rotatable within said valve sleeve, said control valve having a primary supply flow path communicating with said first and second output ports, and an auxiliary flow path having a first leakage flow path communicating with a bypass port, said open center control valve selectively connecting said bypass port to one of said first and second output ports;

first and second load lines fluidly interconnecting said first and second output ports of said valve sleeve with said first and second input ports of said power output transducer respectively, said control valve being operable to generate hydraulic steering assist as a function of a differential output pressure applied to said first and second load lines of said power output transducer and a differential fluid flow therebetween in response to said rotational inputs; and pressure responsive means for selectively controlling the flow of fluid between said bypass port and the other of said first and second output ports in response to a supply pressure of fluid delivered from a pump to said inlet port of said control valve, said pressure responsive means including a valve operable to inhibit flow from said bypass port from communicating with said first and second load lines when said supply pressure is below a predetermined value thereby causing said flow distribution means to generate desired low pressure values of hydraulic assist, and further operable to permit flow between said bypass port and the other of said first and second output ports when said supply pressure exceeds said predetermined value thereby generating desired high-speed values of hydraulic assist.

9. The power steering system of claim 6, wherein said means for actuating further comprises a pressure transducer for measuring pressure in said supply passage.

10. The power steering system of claim 6, wherein said flow control valve comprises means for communicating hydraulic fluid pressure from said supply passage to mechanically open said flow control valve at a predetermined pressure.

* * * * *